United States Patent
Perkins

(10) Patent No.: US 10,394,530 B1
(45) Date of Patent: *Aug. 27, 2019

(54) COMPUTER READABLE MEDIUM FOR TRANSLATING PROTOCOLS WITH AUTONOMOUS SCRIPT WRITER

(71) Applicant: Tilden Tech Holdings LLC, Houston, TX (US)

(72) Inventor: Stephen D Perkins, Santa Fe, TX (US)

(73) Assignee: Tilden Tech Holdings LLC, Houston, TX (US)

( * ) Notice: Subject to any disclaimer, the term of this patent is extended or adjusted under 35 U.S.C. 154(b) by 241 days.

This patent is subject to a terminal disclaimer.

(21) Appl. No.: 15/620,687

(22) Filed: Jun. 12, 2017

Related U.S. Application Data

(63) Continuation-in-part of application No. 14/512,981, filed on Oct. 13, 2014, now Pat. No. 9,710,236.

(51) Int. Cl.
    *G06F 8/30* (2018.01)
    *G06F 9/54* (2006.01)

(52) U.S. Cl.
    CPC ............... *G06F 8/31* (2013.01); *G06F 9/541* (2013.01)

(58) Field of Classification Search
    CPC ........................................................ G06F 8/31
    See application file for complete search history.

(56) References Cited

U.S. PATENT DOCUMENTS

| | | | |
|---|---|---|---|
| 5,671,417 A * | 9/1997 | Miclette et al. | 717/130 |
| 2002/0004819 A1* | 1/2002 | Agassy et al. | 709/203 |
| 2005/0138051 A1* | 6/2005 | Gardner | 707/101 |
| 2006/0059462 A1 | 3/2006 | Yamamoto | |
| 2008/0083012 A1 | 4/2008 | Yu et al. | |
| 2008/0301702 A1* | 12/2008 | Gibbs et al. | 719/311 |
| 2009/0249368 A1* | 10/2009 | Needamangala et al. | 719/328 |
| 2011/0307630 A1* | 12/2011 | Lange et al. | 709/246 |

* cited by examiner

*Primary Examiner* — Philip Wang
(74) *Attorney, Agent, or Firm* — Wood, Phillips, Katz, Clark & Mortimer

(57) ABSTRACT

The disclosed subject matter presents a method for translating between protocols using an extended scripting language. In one embodiment ECMA-262 scripting language is extended to enable one with ordinary skill in the art to create scripts which may be used to perform diverse data manipulation including, but not limited to: file input/output, database manipulation, data identification, data translation, XML functionality, SMB functionality, email, etc. Additionally provided for is running the extended scripting language alongside a binary to manipulate data such that changes can be implemented without requiring the recoding and/or recompiling of the binary. In other embodiments, the disclosed subject matter enables the transmission of information via a webservice, with information able to be viewed on a variety of GUI's, and/or manipulated by a script wizard, autonomous script writer or a combination thereof.

14 Claims, 17 Drawing Sheets

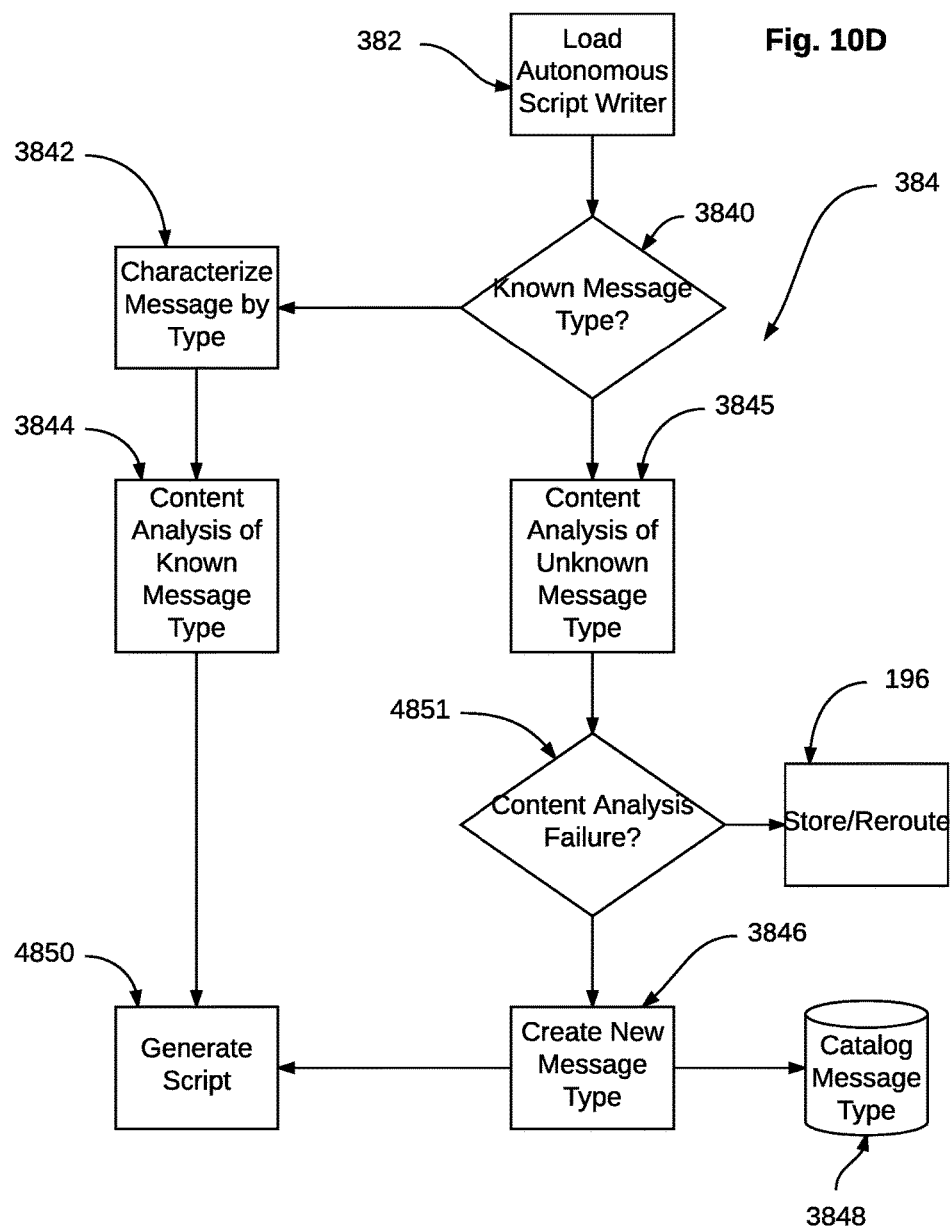

COMPUTER READABLE MEDIUM FOR TRANSLATING PROTOCOLS WITH AUTONOMOUS SCRIPT WRITER

CROSS REFERENCE TO RELATED APPLICATION

This application is a continuation of, and claims the benefit and priority under 35 U.S.C. 120 of U.S. application Ser. No. 14/512,981 filed on 13 Oct. 2014, which is a continuation-in-part (CIP) of U.S. application Ser. No. 14/087,896 entitled COMPUTER READABLE MEDIUM FOR TRANSLATING PROTOCOLS filed on 22 Nov. 2013 and issued on 14 Oct. 2014 as U.S. Pat. No. 8,863,081, which is a CIP of U.S. Non-Provisional patent application Ser. No. 12/570,962 entitled "COMPUTER READABLE MEDIUM FOR TRANSLATING PROTOCALS" filed on Sep. 30, 2009 and issued on 26 Nov. 2013 as U.S. Pat. No. 8,595,698, which claims the benefit and priority under 35 U.S.C. 119 to U.S. Provisional Patent Application Ser. No. 61/101,537, entitled "METHOD AND PROGRAM FOR TRANSLATING PROTOCOLS" and filed on Sep. 30, 2008. Each fore mentioned application is herein incorporated by reference in their entirety for all purposes.

FIELD OF THE INVENTION

The disclosed subject matter relates to the interconnectivity of communication systems. More specifically, the disclosure teaches how to extend a scripting language for customizable protocol transformation.

BACKGROUND OF PRIOR ART

One of the biggest problems confronting the aerospace industry is achieving efficient communications among disparate information technology architectures. Aerospace companies with legacy equipment that is decades old must communicate with the most modem innovations. In addition, these dissimilar technologies must all adhere to common messaging standards.

For instance, some aerospace mission-critical messages may require a specific format, i.e., all capital letters. Or messages may need to be transformed from the industry's legacy TypeB format to XML for emailing or SMS. As no software application can be developed for all possible needs, companies often find themselves constricted when needing data manipulation functions beyond the application's basic purpose.

One solution has been for each company to write new software or adapt existing software, usually by modifying and extending the functionality of an existing application or .dll file. The company may outsource the modification to a third party or to the developing software company to customize the application specifically for its unique needs. Either approach takes a large IT staff experienced in multiple programming languages, takes long periods of time to succeed and takes considerable financial investment. Modification, compilation, installation and testing of existing source is extremely time consuming.

However, a simpler, less costly, and less time consuming method of transforming protocols is often required. For example, U.S. application Ser. No. 11/740,795, having common inventor Stephen D. Perkins of the present disclosure, entitled METHOD, SYSTEM, APPARATUS, AND PROGRAM TO FACILITATE COMMUNICATIONS BETWEEN SYSTEMS" (hereinafter "Application '795") eases communication between a plurality of communications devices having a plurality of communications protocols. One step in the process of Application '795 requires transforming incoming information, which is in the protocol of the sending device, to the outgoing protocol required by the receiving device. Methods of the prior art require complex protocol manipulations, costly software development projects, and wasted time for developers to learn proprietary or in-house protocols to develop such transformation programs. A simple, scalable program which allows one with ordinary skill in the art to develop transformation scripts is desirable. This would allow a simple, cost-effective, time-manageable solution for transforming between protocols. It should be noted that such a method may have many applications which will be apparent to one with ordinary skilled in the art.

SUMMARY

The disclosed subject matter presents a real time method for translating between protocols using an extended scripting language. In one embodiment ECMA-262 scripting language is extended to enable one with ordinary skill in the art to create scripts which may be used to translate data between protocols. In one embodiment this allows for translating between a TypeB system and XML. In another embodiment, the user and/or autonomous script writer may create a script for example to translate between a TypeB system and an email message.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages be included within this description, be within the scope of the accompanying claims.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

For a more complete understanding of the present embodiment, and the advantages thereof, reference is now made to the following brief descriptions, which are to be taken in conjunction with the accompanying FIGURES, in which like reference numerals indicate like features.

FIG. 10D provides a process flow applying a present disclosure of an autonomous script writer to a process disclosed in Application '795.

Figure 1:
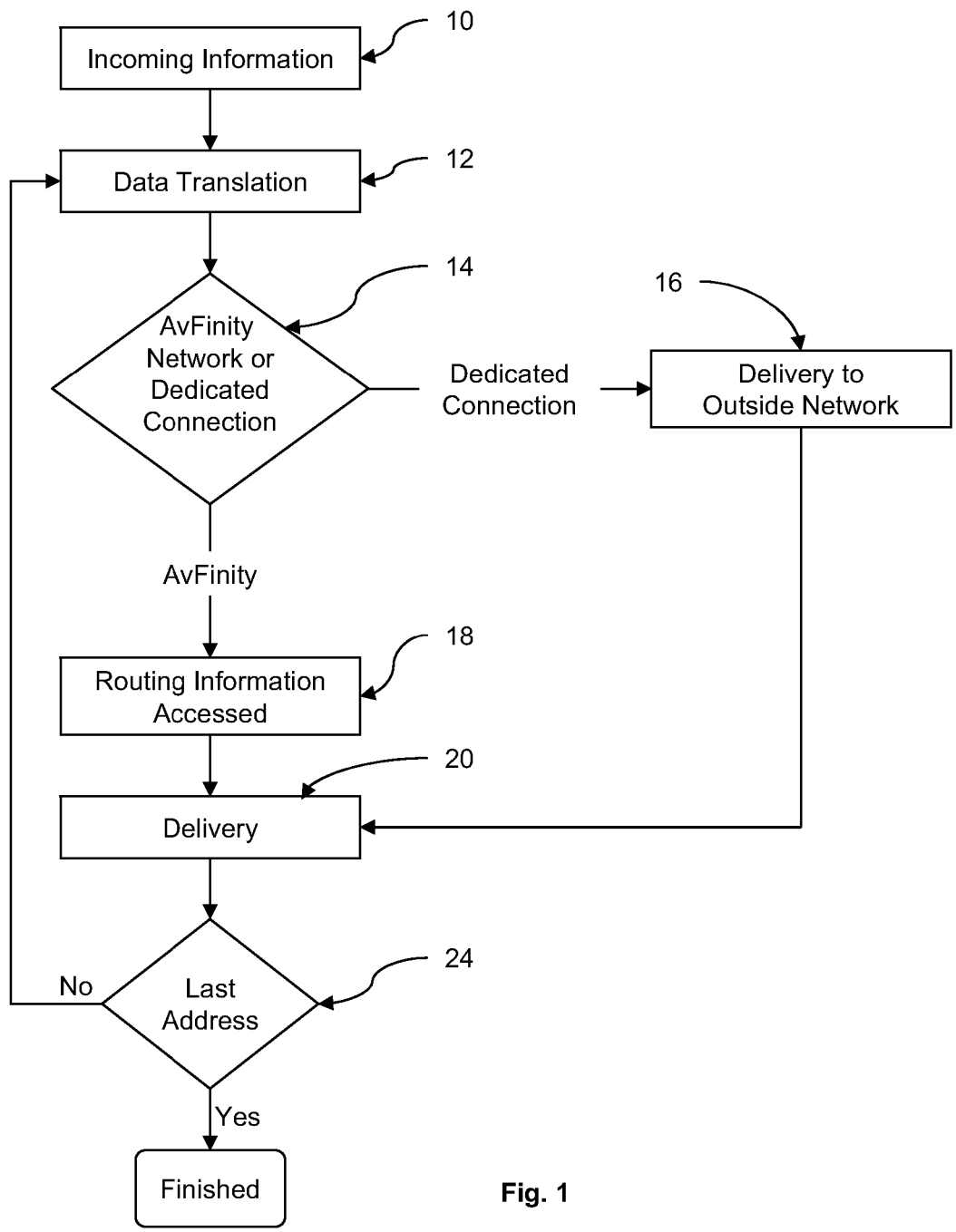
FIG. 1 presents an example of the translation and routing procedure using the example of transmission to a TypeB formatted message.

The detailed description set forth below in connection with the appended drawings is intended as a description of exemplary embodiments in which present invention can be practiced. The term "exemplary" used through this description means "serving as an example, instance, or illustration," and should not necessarily be construed as preferred or advantageous over other embodiments. The detailed description included specific details for the purpose of providing a thorough understanding of the present invention. However, it will be apparent to those skilled in the art the present invention may be practiced without these specific details. In some instances, well known structures and devices are shown in block diagrams form in order to avoid obscuring the concepts of the present invention.

SPECIFICATION

The prior art methods mentioned heretofore require complex and time consuming software projects for developing translation programs. A more efficient solution is to use a scripting programming language. Generally, a scripting language is an interpretive programming language that is used to manipulate, customize, and automate the facilities of an existing system without the need to compile. In such systems, useful functionality is already available through a user interface, and the scripting language is a mechanism for rapidly exposing that functionality to program control.

ECMAScript is a scripting language standardized by ECMA International in the ECMA-262 specification. The ECMA-262 specification does not have provisions for writing to files, inserting to databases, converting to XML or other desirable functionality. ECMAScript was intended to be only an "object oriented programming language for performing computations and manipulating computational objects within a host environment." The present disclosure takes this basic tool and extends it to a more expansive and useful utility. The disclosed subject matter gives a user with basic programming skills or an autonomous script writer the flexibility to manipulate data in a short period of time without needing an expert.

Several functions are provided which enable useful data manipulations for translating between protocols. The functions below enable the user and/or an automomous script writer to determine what kind of data needs to be translated. The user and/or autonomous script writer may determine from a number of formats including, but not limited to, TypeB, plain text, and binary.

| | |
|---|---|
| TYPE B: | obj.dataisTypeb( ); |
| Notes: | Tests against conduit setting. |
| Returns: | true or false |
| Example: | if(obj.dataisTypeb( )){.  .} |
| TEXT: | obj. dataisText( ); |
| Notes: | Tests against conduit setting. |
| Returns: | true or false |
| Example: | if(obj.dataisText( )){.  .} |
| TEXT: | obj. dataisBinary( ); |
| Notes: | Tests against conduit setting. |
| Returns: | true or false |
| Example: | if(obj.dataisBinary( )){.  .} |

Other functions are provided to read, write, save, append, copy, move, delete, and otherwise deal with file objects of different data types.

| | |
|---|---|
| Read File: | obj.readFile("fully qualified path to file and filename"); |
| Notes: | Path requires double backslashes |
| Returns: | contents of file |
| Example: | var msg = obj.readFile("C:\\mydirectory\\filename.txt"); |
| Write File: | obj.saveFile("fully qualified path for file and filename"); |
| Notes: | Path requires double backslashes |
| Returns: | true if file written, otherwise false |
| Example: | var msg = "This is the contents of the file"; obj.saveFile(msg,"C:\\somefolder\\mycontents.tct"); |
| Write File Random Name: | obj.saveRndFile(msg, "fully qualified path for file", extension); |
| Notes: | Path requires double backslashes; Automatically generates unique filename with desired extension; Default extension is "txt". |
| Returns: | true if file written, otherwise false Example: var msg = "This is the contents of the file"; obj.saveRndFile (msg, "C:\\somefolder\\", "txt"); |
| Append File: | obj.appendFile(msg, "fully qualified path for file and filename") ; |
| Notes: | Path requires double backslashes |
| Returns: | true if file written, otherwise false |
| Example: | var msg = "This is the contents of the file ... More stuff"; obj.appendFile (msg, "C:\\somefolder\\mycontents.txt"); |
| File Name: | obj.lastFileName( ); |
| Notes: | Returns the name of the last file written Returns: Fully qualified path with file name Example: var lastFile = obj.lastFileName( ); |
| File List: | obj.getFileList("Search Directory", "wildcard", sortby, sortorder); |
| Notes: | Returns a list of files; Sortby: 0 = ascending, 1 descending; SortOrder: 0 = name, 2 = time, 3 = unsorted |
| Returns: | File name only |
| Example: | var fileList= obj.getFileList ("C:\test", "*.txt", 0, 3) ; |
| Copy File: | obj.copyFile ("Original File", "Destination File"); |
| Notes: | Copies a file |
| Returns: | true if successful, otherwise false |

| | |
|---|---|
| Example: | var lastFile = obj.copyFile("C:\tmp\filel", "C:\myDir\filel"); |
| Move File: | obj.moveFile("Original File", "Destination File"); |
| Notes: | Moves a file |
| Returns: | true if successful, otherwise false |
| Example: | var lastFile = obj.moveFile("C:\tmp\filel", "C:\myDir\filel"); |
| Delete File: | obj.deleteFile("File Name"); |
| Notes: | Deletes a file |
| Returns: | true if successful, otherwise false |
| Example: | var lastFile = obj.deleteFile("C:\tmp\filel"); |

Further, functions are provided for processing e-mail communications. An example of such a function is provided below. Other functions relating to the processing of e-mail communications may also be provided.

| | |
|---|---|
| Email: | obj.MailMessage(SmtpServer, From, Subject, ReplyTo, Body, ToAddress, Attachments, Account, Password, int iPort, bool bSSL) |
| Notes: | Supports SSL as well as traditional mail transfer. To Address may be multiple delimited by semi-colon (;) Attachments use fully qualified path to attachment files delimited with semi-colon (;). Port 465 standard for SSL and 25 standard for traditional email. |
| Returns: | Mail return code. Use obj.lastMailError( ) to get text error. |
| Example: | obj.MailMessage("smtp.gmail.com", "AvCentric@gmail.com", "Scripting Test", "test@avcentric.com", msg, "test@avcentric.aero", """"AvCentric@gmail.com", "myPassword", 465, true); |

Additionally, functions relating to the processing of database instructions, XML-type documents, and TypeB communications are provided. These additions to the ECMA scripting language allow fast and flexible conversion scripts to be written by a user and/or an automonous script writer. Some examples of these processing instructions are provided below. The first function returns the complete TypeB message. Other functions relating to the processing of various data types may also be provided.

| | |
|---|---|
| Type B: | Complete Message: obj.typebMessage( ); |
| Notes: | Returns: Complete Type B Message |
| Example: | var typeB-Message = obj.typebMessage( ); |
| Priority: | obj.typebPriority( ); |
| Notes: | |
| Returns: | Two Letter priority |
| Example: | var priority= obj.typebPriority(; |
| Originator: | obj.typebOriginator( ); |
| Notes: | |
| Returns: | 7 character origination address |
| Example: | var origination= obj.typebOriginator( ); |
| DateTime: | obj.typebDateTime( ); |
| Notes: | |
| Returns: | 6 character day hour minute |
| Example: | var timestamp = obj.typebOriginator( ); |
| Destination Addresses: | obj.typebMsgAdd( ); |
| Notes: | Maximum 48 addresses |
| Returns: | string of destination addresses delimited by space |
| Example: | var destinationAddressString = obj.typebMsgAdd( ); |
| TypeB Body: | obj.typebTextBuf( ); |
| Notes: | |
| Returns: | Type B Message Body |
| Example | var TypeB_Body = obj.typebTextBuf( ); |
| TypeB Day Time String: | obj.getTypeBDayTime( ); |
| Notes: | Returns the Type B Day/Time Stamp Returns: day and time in GMT, ie. 241018 |
| Example: | var typebDayTimeStamp = obj.getTypeBDayTime( ); |

Further, instructions are provided for processing database instructions. The example below allows a user and/or autonomous script writer to insert data into a SQL database. Other instructions may also be provided which are within the scope of the present disclosure and are apparent to those with ordinary skill in the art.

| | |
|---|---|
| Database SET SQL Statement: | Obj.setSQL(QString mSQL); |
| Notes: | |
| Returns: | Nothing |
| Example: | Obj.setSQL ("Insert into test_tbl(fid, fvarchar20) values(:1,:2)"); |
| Database Open: | obj.dbinit (DB, login, password, DatabaseType); |
| Notes: | Database Type |
| |   1  SA_ODBC_Client |
| |   2  SA_Oracle_Client |
| |   3  SA_SQLServer_Client |
| |   4  SA_InterBase_Client |
| |   5  SA_SQLBase_Client |
| |   6  SA_DB2_Client |
| |   7  SA_Informix_Client |
| |   8  SA_Sybase_Client |
| |   9  SA_MySql_Client |
| | 10  SA_PostgreSQL_Client |
| Returns: | true if connection is established, otherwise false |
| Example: | var connected= obj.dbinit("ATIM", "sa", "password", 3) ; |
| Database Execute SQL: | obj.dbExec(QString mSQL); |
| Notes: | |
| Returns: | true if executed, otherwise false |
| Example: | var connected= obj.dbExec ("INSERT INTO MYTABLE (ID, MYTEXT) VALUES (100, 'Testing')"); |
| Database Execute SQL: | obj.dbExec( ); |
| Notes: | Used to execute SET SQL Statements |
| Returns: | true if executed, otherwise false |
| Example: | var result= obj.dbExec( ); |
| Database Fetch: | obj.dbFetch( ); |
| Notes: | Fetches result |
| Returns: | true if executed, otherwise false |
| Example: | var result= obj.dbFetch( ); |
| Database SET String: | obj.dbsetParamString(int pos, QString val); |
| Notes: | Position, value |
| Returns: | Nothing |
| Example: | obj.dbsetParam String (1, "Some Value"); |
| Database SET Integer: | obj.dbsetParamint(int pos, int val); |
| Notes: | Position, value |
| Returns: | Nothing |
| Example: | obj.dbsetParamint (1, 50); |
| Database SET BLOB: | obj.dbsetParamBlob(int pos, int val); |
| Notes: | Position, value |
| Returns: | Nothing |
| Example: | obj.dbsetParamBlob (1, "Some huge amount of text"); |
| Database GET String: | obj.dbGetString (field); |
| Notes: | Position, value |
| Returns: | Nothing |
| Example: | var body= obj.dbGetString ("TYPEB_BODY"); |
| Database GET Integer: | obj.dbGetint (field); |
| Notes: | Position, value |
| Returns: | Nothing |
| Example: | int val obj.dbGetint (field); |
| Database GET BLOB: | obj.dbGetBlob (field); |
| Notes: | Position, value |
| Returns: | Nothing |
| Example: | var myBlob = obj.dbGetBlob (field); |

Next, other instructions enable a user and/or an autonomous script writer to get, set, or determine the direction of data (incoming or outgoing). The instructions are presented below. Other instructions may also be provided which are within the scope of the present disclosure and are apparent to those with ordinary skill in the art.

| | |
|---|---|
| Message: | obj.getMessage( ) |
| Notes: | Message Data |
| Returns: | returns TypeB, Binary, Text |
| Example: | int message= obj.getMessage( ); |
| Message: | obj.setMessage( ) |
| Notes: | Sets Message Data |
| Returns: | Nothing |
| Example: | obj.setMessage(msg); |
| Routing Direction: | obj.dataDirection( ) |
| Notes: | Determines if message is outbound or inbound |
| Returns: | (I)nbound, (O)utbound |
| Example: | var direction= obj.dataDirection( ); |

Additionally, examples of error reporting are provided below. Other instructions may also be provided which are within the scope of the present disclosure and are apparent to those with ordinary skill in the art.

| | |
|---|---|
| Email Plain Text Error: | obj.lastMailError ( ); |
| Notes: | |
| Returns: | Last email error |
| Example: | var emailError = obj.lastMailError( ); |
| Script Errors: | obj.getlastError( ); |
| Notes: | |
| Returns: | Last script error |
| Example: | var scriptError = obj.getlastError( ); |

Below gives an example of printing functionality. Other instructions may also be provided which are within the scope of the present disclosure and are apparent to those with ordinary skill in the art.

| | |
|---|---|
| Printing: | obj.printMessage(message, printer); |
| Notes: | |
| Returns: | Nothing |
| Example: | obj.printMessage(msg, "PrinterI"); |
| SMB functionality includes: | |
| Reads a SMB Client File: | obj.reac1File ( ) |
| Return values: | n where n is the number of bytes read |
| | −1 on error with txtError and intError set |
| Writes a SMB Client File: | obj writeFile( ) |
| Return values: | n where n is the number of bytes written |
| | −1 on error with txtError and intError set |
| Deletes a SMB Client File: | obj deleteFile( ) |
| Return values: | 0 success |
| | −1 on error with txtError and intError set |
| Prepares list of available SMB: | obj.init_buildFilel_ist( ) |
| Return values: | 0 on success |
| | −1 on error with txt. Error and intError set |
| Returns list SMB client files: | obj.buildFileList ( ) |
| Return values: | n where n is the number of files in the list |
| | −1 ( SMB CLIENT ERROR) if error with txtError and intError set |
| Returns single file name from list: | obj.GetNextFileName( ) |
| Return values: | 1 if a file name is being returned |
| | 0 no more file names are available for return |
| | −1 (SMB_CLIENT_ERROR) if error with txtError and int.Error set. |
| Releases build list resources: | obj close_buildFileList ( ) |
| Return values: | None |
| XML functionality includes: | |
| Creates Empty XML Document: | void obj.createDocument(QString doc); |
| Add XML tag: | void obj.addElement(QString elem, QString node); |
| Add associated text to tag: | void obj.addText(QString text. QString node); |

| | |
|---|---|
| Retrieve resultant XML text as a Qstring object: | QString obj.getXMLDocO; |

To provide additional insight, an example script is provided below:
//Function to Mail a Message Function mailMessage( )
{
obj.MailMessage("smtp.gmail.com",
  "TestAvCentric@gmail.com", obj.typebOriginator( ),
  "test@avcentric.com", obj.typebMessage( ),
  "test@avcentric.aero", " ",
  "TestAvCentric@gmail.com", "password", 465, true);
//Function to print a message to a specific printer Function printMessage( )
{
obj.printMessage(obj.typebMessage( ), uLexmark X6100 Series");
}
//Function to save a Message using a random file name Function saveMessage( )
{
Obj.saveRndFile(obj.typebMessage( ), uA:\\");
}
mailMessage( ); //First mail the message printMessage( );
//Second print the message
obj.saveRndFile(obj.typebOriginator(, "A:\\"); //Third save the message in the defined directory with a random file name using an ATIM object
//Last test if the originator is "AUSUTXH" and if so, save the message
if(obj.typebOriginator( )=="AUSUTXH")
{
saveMessage( );
}

Novel elements in this innovation include extended ECMA scripting so that it provides: file manipulation, data type determination, email capability, Type B data information, database interaction, creation of XML, printing, error reporting, and other data manipulations, interactions, and discovery. The instructions described above are only some of the function which may be provided to enable a user and/or autonomous script writer to create scripts to translate between protocols, perform data transformation, and perform data manipulation.

The methods and program of the present disclosure have particular application in the transformation of aircraft communication protocols. Accordingly, the following FIGS. 1 through 9 present an illustrative embodiment facilitating communication between communications devices which may be used for aircraft operational communications. For a more detailed description of the subject matter to which the following FIGS. 1 through 9 pertain, reference is now made to Application '975 having common inventor with the present disclosure and which is expressly incorporated by reference. Note that the following illustrative drawings and explanations derive from Application '795, and accordingly, not all referenced items in the following figures are explained in complete detail. In the event that explanations for such reference items is desired, reference may be readily made to Application '795.

Preferred embodiments of this disclosed subject matter are described herein, including the best mode known to the inventors for carrying out the disclosed subject matter. Variations of those preferred embodiments may become apparent to those of ordinary skill in the art upon reading the foregoing description. The inventor expects skilled artisans to employ such variations as appropriate, and the inventor intend for the disclosed subject matter to be practiced otherwise than as specifically described herein. Accordingly, this disclosed subject matter includes all modifications and equivalents of the subject matter recited in the claims appended hereto as permitted by applicable law. Moreover, any combination of the above-described elements in all possible variations thereof is encompassed by the disclosed subject matter unless otherwise indicated herein or otherwise clearly contradicted by context.

The disclosure describes a method, system, apparatus, and program for interfacing multiple communication systems. The interface receives information from the client or server, followed by determination of the format of said information. The terminal is any piece of equipment which executes the interface. On inbound information, the server is the component that receives the information from the client and transforms the information into a format compatible with the third party. The server then sends the converted information to the intended third party. The process allows communication between the client and third party in both directions.

The server allows a client to communicate over communication systems that do not follow the same format or communication protocols as the client's own communication system. The server uses any one of the available communication systems used by those skilled in that art to communicate with other communication devices and networks. By using the interface, the client can interact with communication systems that use various information formats. Any communication system can utilize the server provided the interface has been configured to process the communication from both the said third party system and said client's system. The embodiment used in this example relates to the aviation industry.

FIG. 1 is a functional block diagram of an exemplary use of the disclosed subject matter in a communication environment. The client sends a message 10 which is transformed 12 into a format compatible with the third party. The system determines if the message will be sent over a dedicated connection or over the Internet 14. Third parties with a dedicated connection to the server allow the server to communicate with the third party via the dedicated connection 16. Third parties connected to the server by a dedicated connection can be the recipient of the information, or can retransmit the information to the appropriate destination. In one embodiment all communications are accomplished using a secure transfer tunnel/protocol (e.g. SSL, VPN).

If the third party recipient does not have a dedicated connection to the server, the server receives routing information 18 to locate the appropriate destination to deliver 20 the information via the Internet. The process repeats until the information has been converted and sent to all appropriate third parties 24.

An example of the preceding process would include a client entering the passenger list, the cargo manifest, and flight plan into the interface. The interface takes the information provided and determines which pieces of information are transmitted over the different communication systems. Once the information is properly sorted, the terminal places the information into the proper format and transmits the information to the appropriate third party. When information is sent to the third parties, the information designates the server as the sender, not the server client. Any response from the third party goes to the server, which in turn routes the response to the appropriate client.

Figure 2:
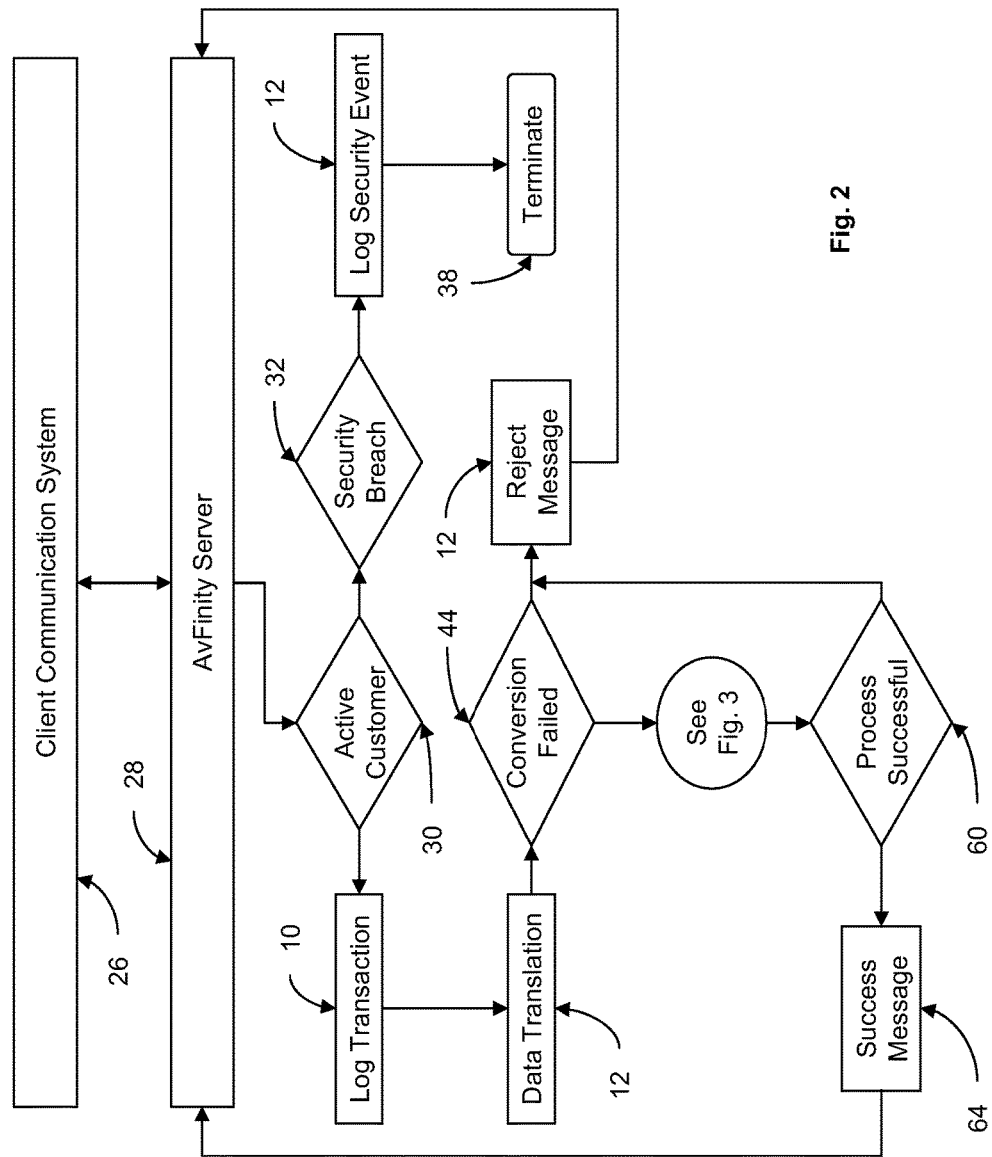
FIG. 2 shows a diagram of how customers can access the server and how messages are converted into different formats and routed to different third party communication systems.

The server illustrated in FIG. 2 represents an embodiment referenced in this disclosure. When the client uses their communication system 26 (example includes ARC (AvFinity Remote Client) or a client specific system), the AvFinity server 28 receives information from the client. The server verifies the client as an active client 30. If the client is not an active customer, then there is a check to see if there has been a security breach 32. If there has been no security breach, then the client is notified of the transaction rejection 34. If there has been a security breach, the server logs the event as a security alert 36 and terminates the transaction 38.

If the server recognizes the client as an active customer 30, the server logs the transaction 40 and begins the data translation 41. The basis for the translation algorithm comes from any source available to those skilled in the art. One embodiment allows for the server to analyze the incoming communication structure and determine the needed output format. Another embodiment looks at the incoming communication and determines the needed output format based on the destination of the communication. Another embodiment has the incoming communication send a separate piece of information telling the server what format to translate the incoming communication into. In the event of an unsuccessful translation 44, the system generates a rejection message 34.

Figure 3:
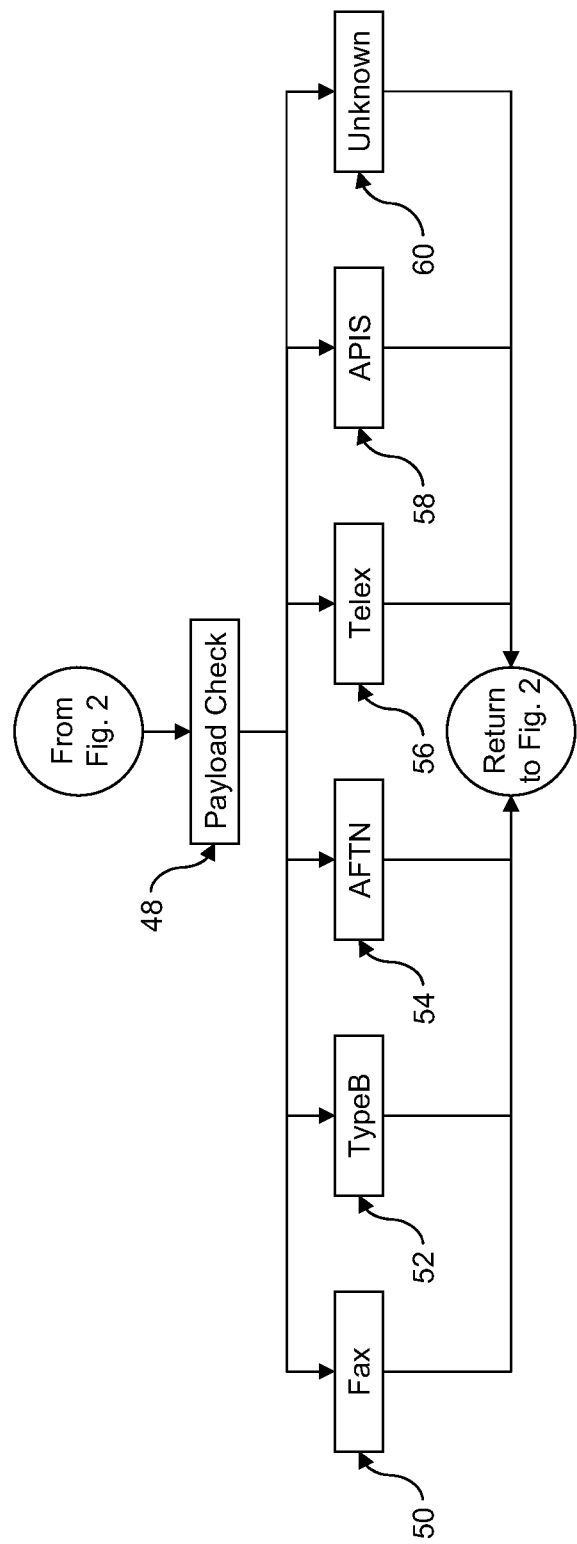
FIG. 3 illustrates how the equipment checks the message format and route the message to the appropriate third party destination.

After a successful translation, the outgoing communication then proceeds to the appropriate third party as shown in FIG. 3. The server directs the message based on the format of the message 48. Examples of these can include facsimile 50, TypeB 52, AFTN 54, Telex 56, APIS 58, or other communication formats 60 used by those in the industry. After the message transmits, the system confirms the message has been received by the third party 62 in FIG. 2. A success message 64 notifies the client if the message completed, while a rejection message 34 notifies the client if the message did not transmit properly.

Third parties who receive the communication do so in the format tailored for their individual systems. Examples can include legacy systems, VHF communication towers, and satellites.

The preceding disclosure related to clients communicating with third parties. The server also facilitates communication from third parties to clients and between clients. Communication from third parties allows for responses to the clients original communication or allows the third party to initiate communication with the client. The process follows the same steps as those of client initiated communication, but in reverse. The third party sends a communication to the server, which translates the communication from the third party format to the server based format. The server then sends the converted communication to the client. If a client wants to communicate with another client of the service, the server is able to route the communication in the same manner as that of a non-client.

Technology using the disclosed subject matter exists in different configurations based on the knowledge of those skilled in the art. A typical example illustrated in FIG. 4 utilizes the server to communicate messages from the terminal 78 operated by the client with the intended recipient 76. The terminal receives input from a preexisting communication protocol (SMPT/POP3 for example) 68, a database 70, or from a file 72. The message can be sent over a dedicated connection or over the Internet to the server 74 and on to the recipient 76. Internet communications have the option of encryption for added security. Three embodiments described here are Terminal, Terminal Server, and Terminal Conduit Server.

Figure 5:
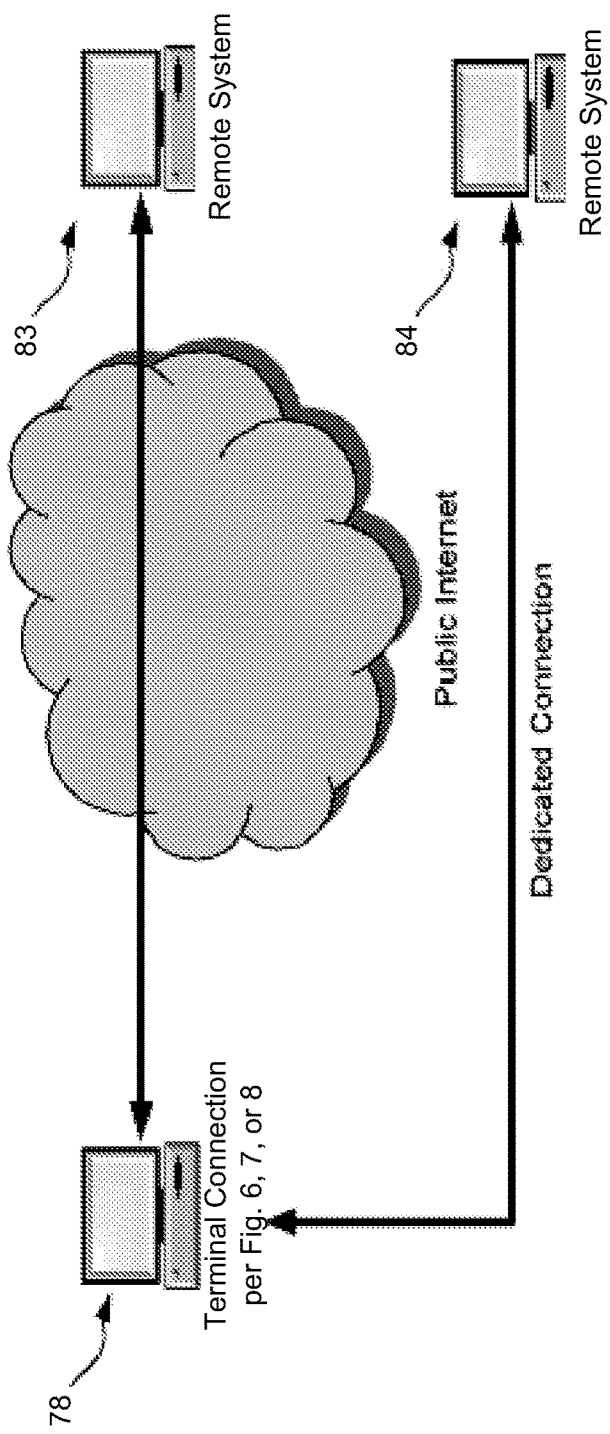
FIG. 5 is a simplified example of the Internet based connection versus direct connection utilized by the Terminal, Terminal Server, and Conduit Server configurations.

FIG. 5 shows common features of all three of the above referenced embodiments. All three embodiments use the terminal 78 to communicate with remote systems 83, 84. The communication occurs over the Internet 80 or over a dedicated communication line 82. The remote systems can be end points of the communication, or can be other distribution networks which disseminate the communication over their own systems to the intended end user.

Figure 6:
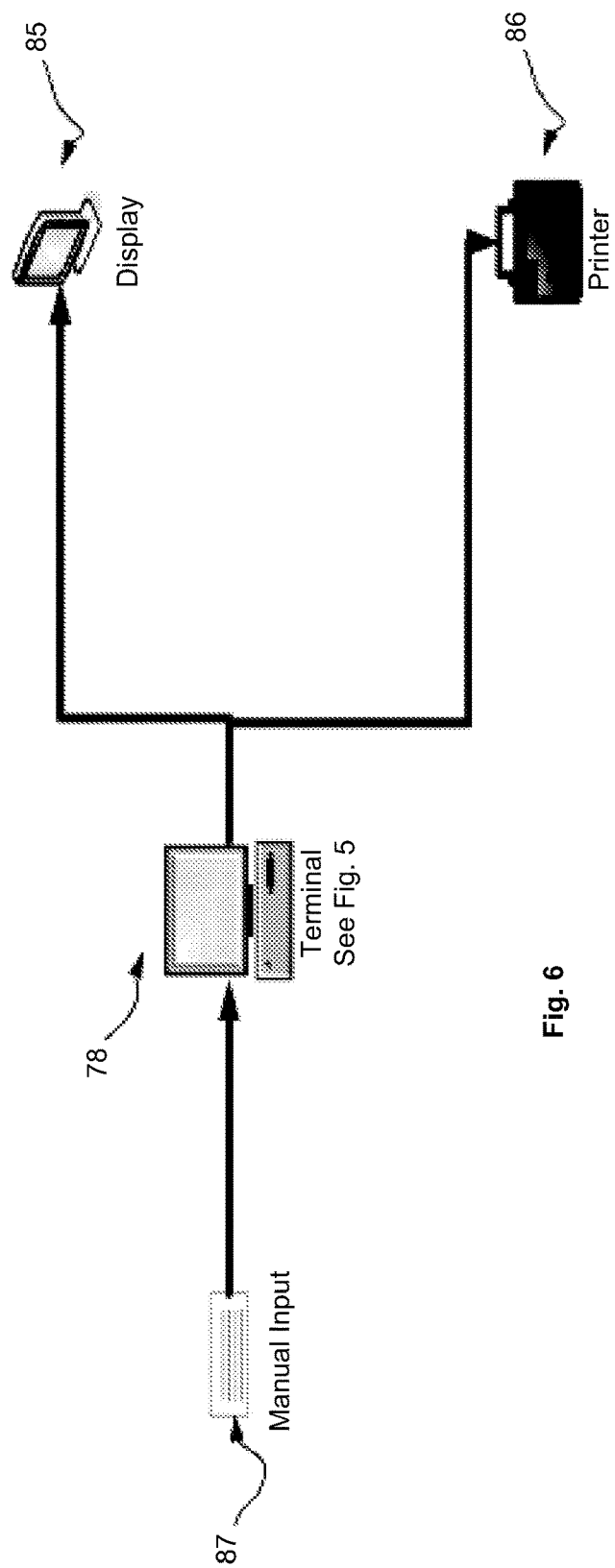
FIG. 6 discloses an example of the Terminal configuration of the disclosure.

The Terminal configuration shown in FIG. 6 involves the use of a terminal 78 that can communicate with third parties. Information 87 is directly input into the terminal 78, and the terminal can receive information from third parties via a display 85 or over a printer 86.

Figure 7:
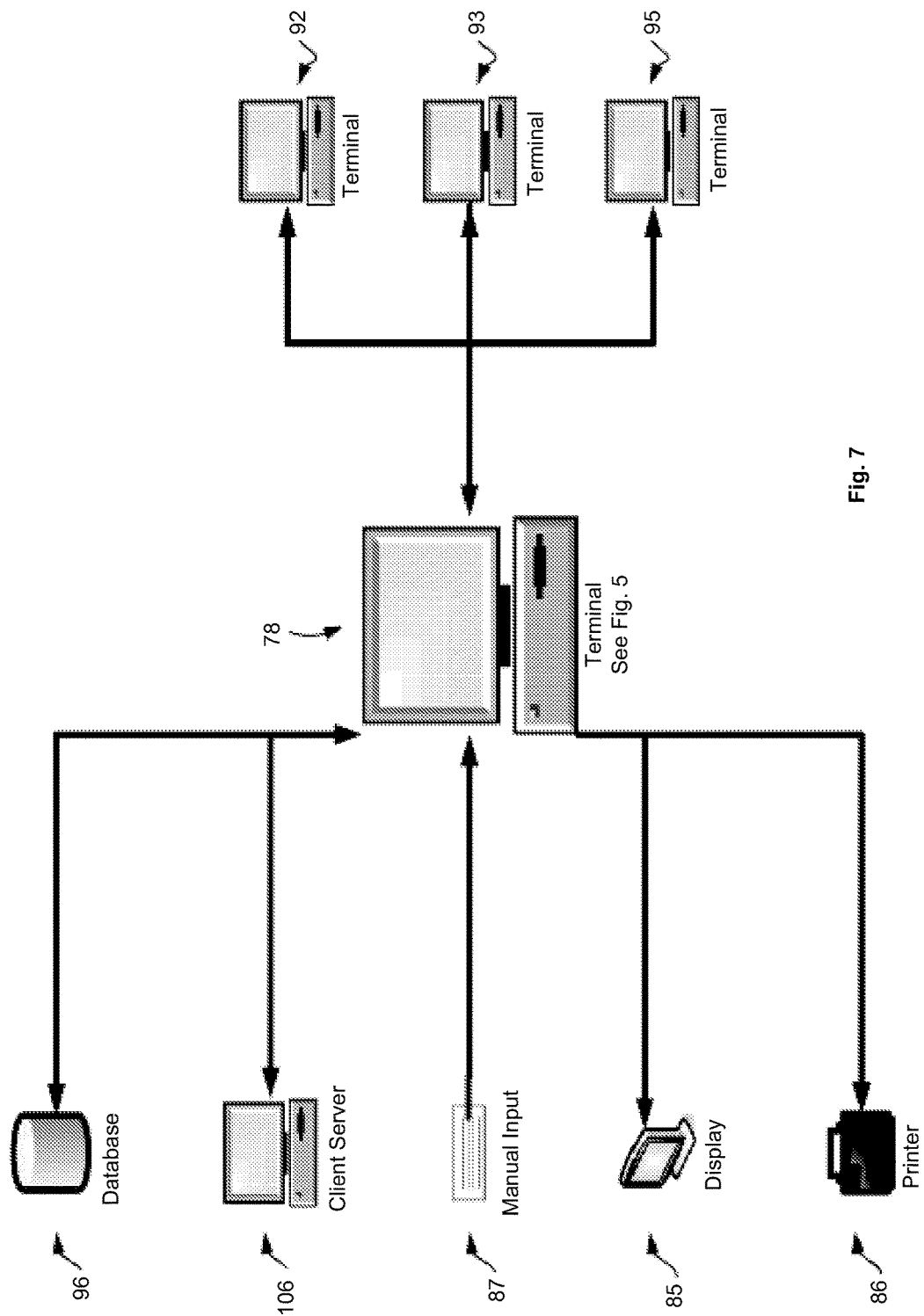
FIG. 7 portrays an example of the Terminal Server configuration of the disclosure.

Alternatively, FIG. 7 shows the Terminal Server configuration, which adds another level to the system disclosed in the Terminal configuration by having multiple subordinate terminals 92 connect to a terminal 78. All subordinate terminals 92 send and receive information from the terminal 78. Clients also send information to the terminal via any other preexisting communication method used by the client 106 or from another data source, such as a database 96 or manual input 87. The terminal again sends and receives information to third parties as disclosed in the Terminal configuration. The terminal can display information via the terminal display 85 or via printer 86.

Figure 8:
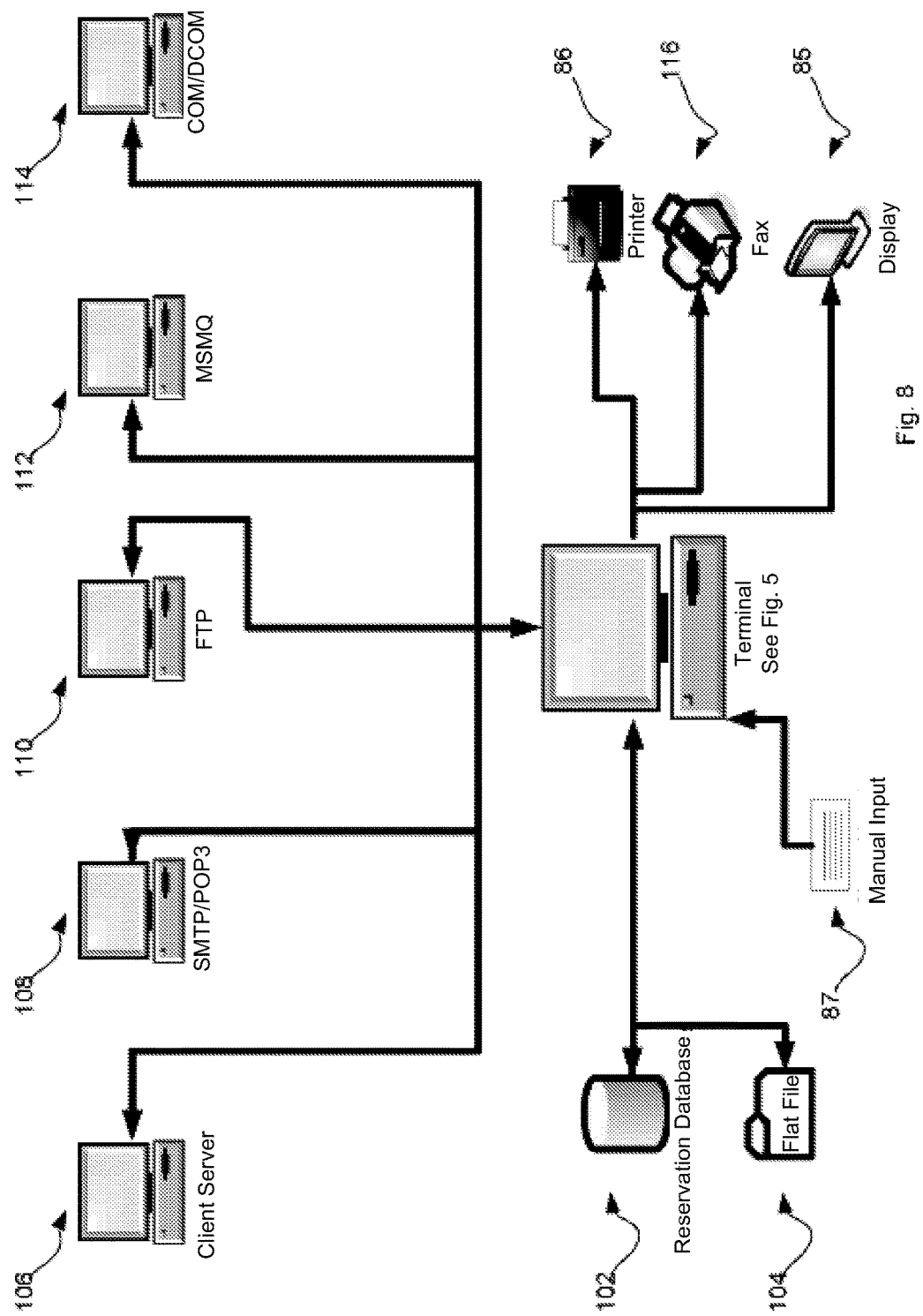
FIG. 8 presents an example of the Conduit Server configuration of the disclosure.

FIG. 8 shows the terminal in a Conduit Server embodiment. Various communication systems link to the terminal 78. Said Communication systems can utilize any form of input method used by those skilled in the art, including manual input 87, a database 102, a file 104, a server using a message oriented middleware for non concurrent servers (such as the IBM MQ Series) 106, SMPT/POP3 108, FTP 110, SOAP 111, a proprietary messenger protocol (such as MSMQ) 112, a language neutral messaging system (such as COM/DCOM) 114, or other communication protocols 115. In the Conduit Server, the communication systems use either AvCentric or non AvCentric protocols known by those skilled in the art. The communication systems send and receive information from the terminal 78, which in turn communicate messages from the terminal through the server, which routes the message to third parties. The terminal can also output messages via a terminal display 85, fax 116, or printer 86.

Figure 9:
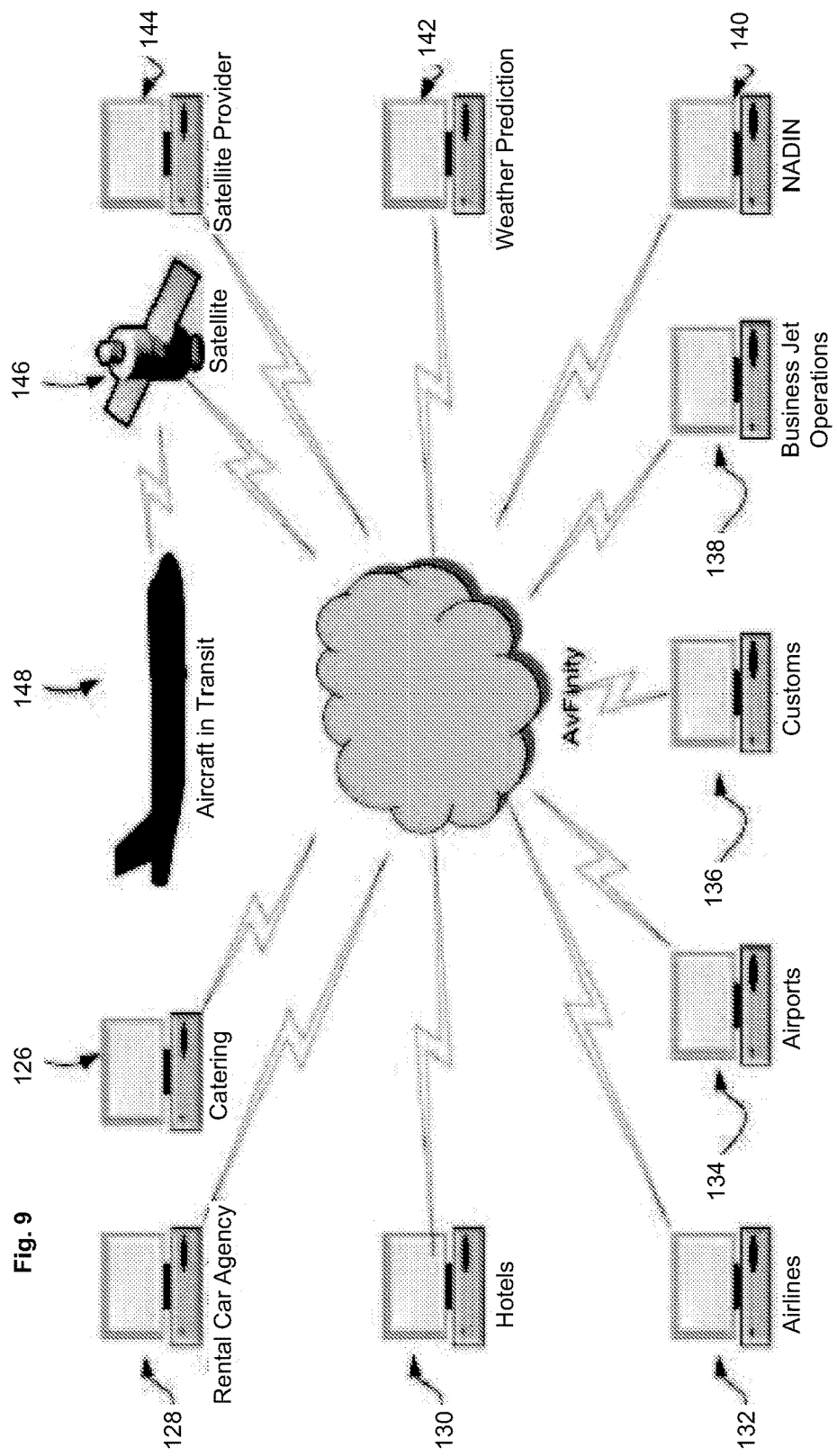
FIG. 9 provides an overview of how the invention allows large scale interconnectivity.

The interconnectivity facilitated by the server is shown in FIG. 9 by the various disclosed embodiments can allow parties in the aviation industry to communicate with one another. Service industries such as catering 126, car rentals 128, and hotels 130 can link with operational entities such as airlines 132, airports 134, customs 136, and business jet operations 138. The server also allows connectivity to technical support such as NADIN (National Airspace Data Interchange Network) 140, weather services 142, satellite providers 144, and satellites 146 that may connect to aircraft 148 in transit.

In addition to facilitating communication between different systems, the interface reduces or eliminates the need to interact with multiple communication systems to compile information available from the other communication systems. Due to the pre-existing incompatibility of communication systems, clients would have to use multiple communication system resources to compile information on a given aircraft or transaction. One system would display the passenger manifest, another would show the cargo manifest, and so on until all the information was displayed. An embodiment of interface allows the client to use one interface to see all the information on a given flight without the need to consult with each individual communication system to retrieve information exclusive to one system.

Another advantage of the disclosed subject matter over preexisting systems comes from the interface's ability to communicate in multiple communication formats without the need to maintain more than a single interface. Preexisting communication systems interact with clients in specific ways, some with dedicated terminals. Others use e-mail or other IT based methods. Even if all the communication systems used by the client are IT based, use of different systems necessitates the maintenance of multiple communication interfaces or equipment. The interface eliminates the need to maintain these separate communication systems to communicate with third parties. The interface allows the client to both send and receive through multiple communication systems via a single interface.

The disclosed subject matter can be embodied in an apparatus that interfaces with multiple communication systems, comprised of incoming information from a transmitting party, a set of instructions for receiving incoming information from a transmitting party, a set of instructions for determining the format of the incoming information from the transmitting party, a set of instructions for identifying the receiving party, a set of instructions for determining the format of outgoing information for the receiving party, a set of instructions for transforming the incoming information into the format required of the outgoing information, and a set of instructions for transmitting the outgoing information to the receiving party. The format of incoming information can be determined by an analysis of the incoming information or a profile associated with the transmitting party. The format of outgoing information can be determined from a profile associated with either the transmitting party or receiving party. The transmitting and receiving parties can be those involved in aircraft communications and coordination. The apparatus can be manipulated using a general purpose computer.

The preceding disclosure describes a method, system, and apparatus for interfacing multiple communication systems, comprising the following steps. The interface receives information from the client, followed by determination of the format of said information. The disclosed subject matter identifies the third party to receive the information and transforms the originally received information into a format compatible for the third party. The server then sends the converted information to the intended third party. The process allows communication between the client and third party in both directions.

Figure 10:
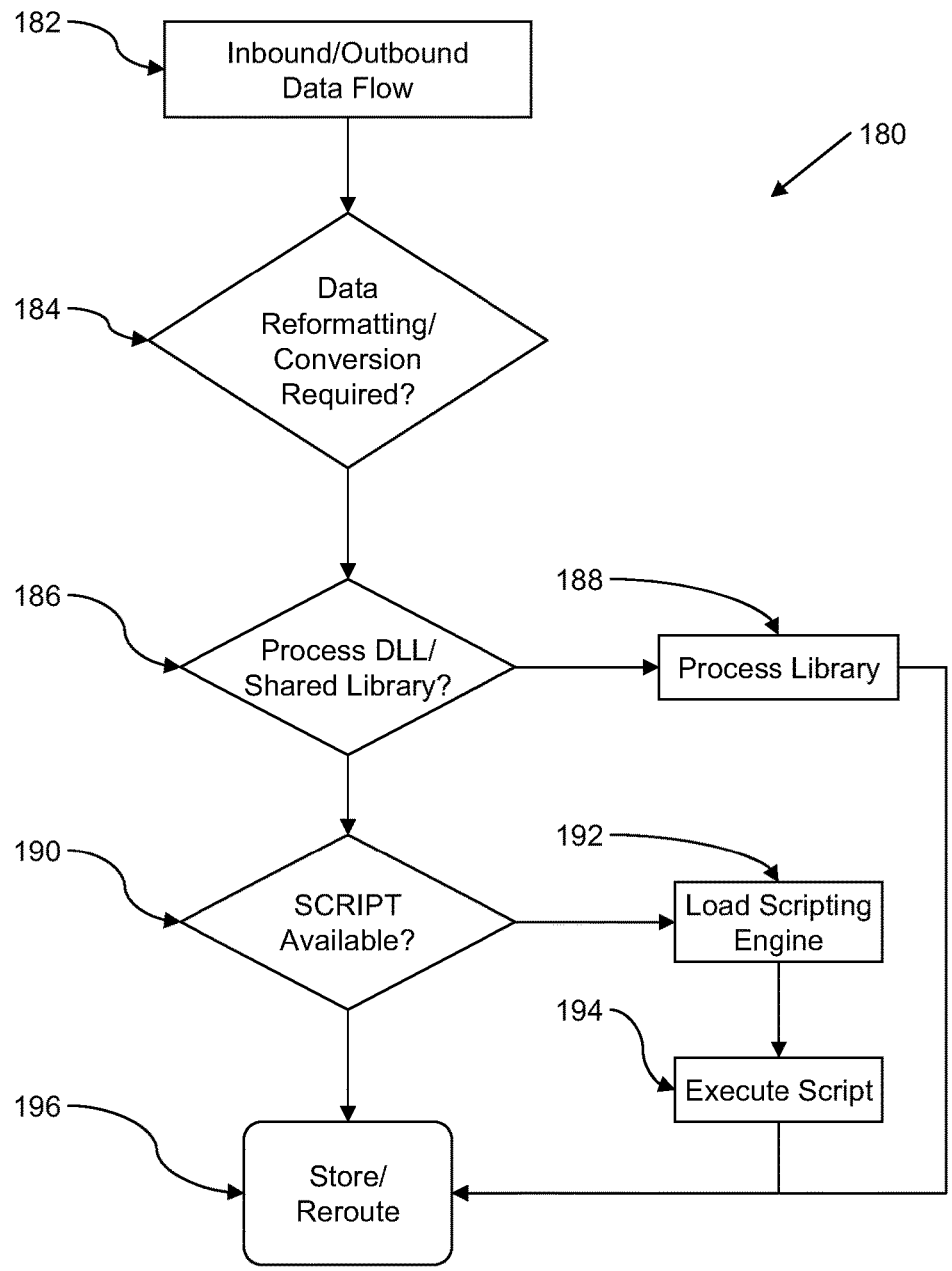
FIG. 10 provides a process flow applying an embodiment of a disclosure in U.S. application Ser. No. 14/512,981 ("Application '981") to a process disclosed in U.S. application Ser. No. 11/740,795.

FIG. 10 presents an embodiment of a process flow 180 from Application '981 integrated with a process disclosed in Application '795. In step 182, inbound data is received by the server. In step 184, the server decides if data reformatting/conversion is necessary. If no conversion is needed, step 196 either stores or routes the inbound data to the proper destination device. However, if data conversion is required from step 184, the server determines if there is already a process .dll file or shared library which may convert the inbound data as shown in step 186 of FIG. 10. If there is such a .dll file or shared library, the inbound data is converted in step 188. The converted inbound data is then either stored or routed in step 196. However, if there is no .dll or shared library in for the inbound data and conversion protocol, step 190 determines whether a script exists for converting between the files. The conversion script is created using embodiments disclosed in Application '981. If a script does exist, the scripting engine is loaded in step 192. The inbound data is converted in step 194 and the converted data is then sent to step 196 to be stored or re-routed to the appropriate destination device. If no script is available to convert the inbound data, the inbound data is stored or routed in step 196. It is contemplated that process flow 180, as disclosed above, is applicable to an outbound data flow 182. See FIG. 10.

Figure 10A:
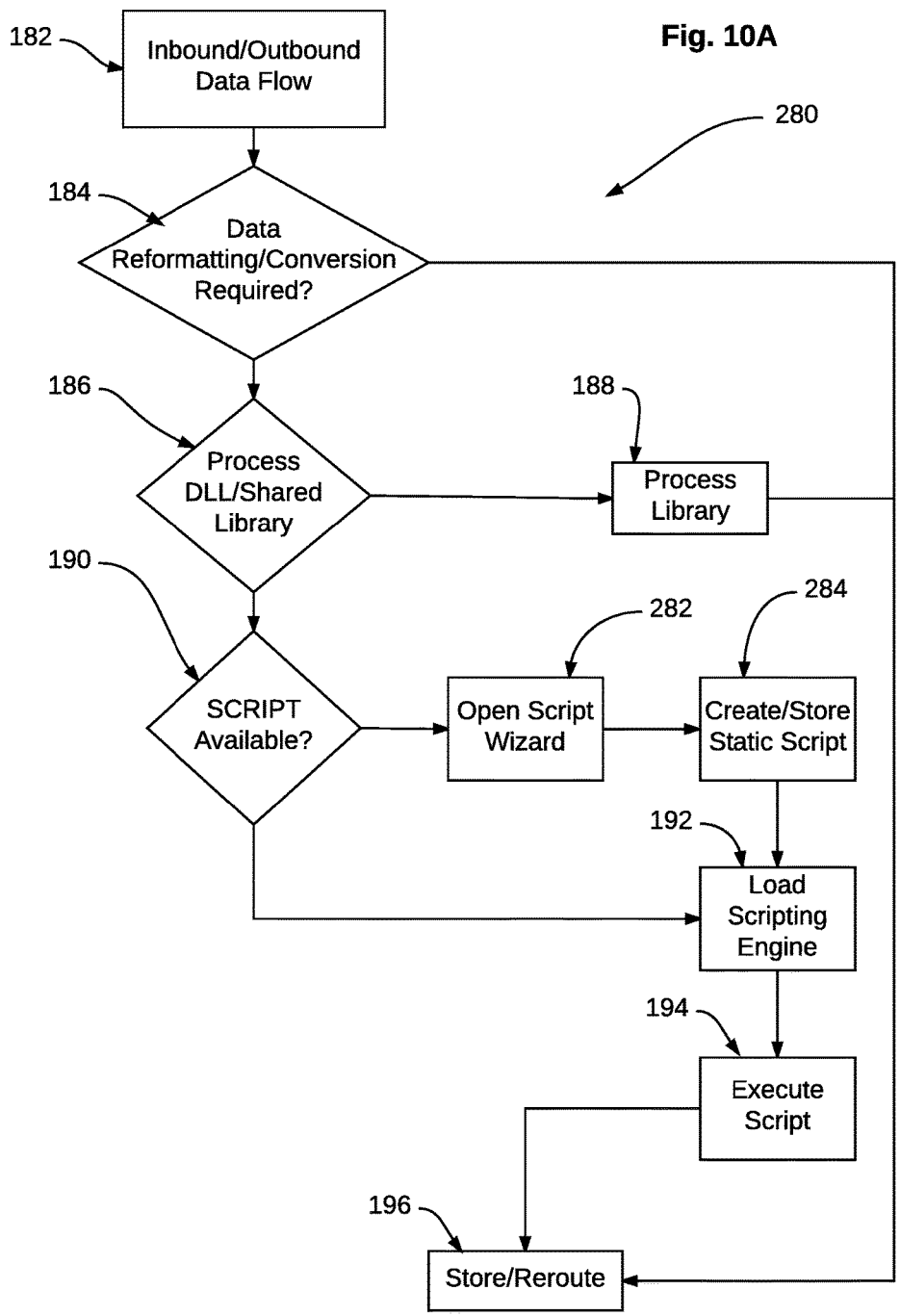
FIG. 10A provides a process flow applying an embodiment of a disclosure in Application '981 to a process disclosed in Application '795.

FIG. 10A presents an embodiment of a scripting wizard process flow 280 from Application '981 integrated with a process disclosed in Application '795. A scripting wizard 282 enables static scripts 281 to be created by entering shortcut language or extensions by users who are unfamiliar with the ECMA-262/Javascript or other programming languages. Scripts created by a script wizard 283 are considered static scripts 281 until stored and used in future data manipulations, wherein each such stored static script 281 becomes an existing script 191.

Similar to a flow process described above, inbound (or outbound) data flow is received by a server in step 182. In step 184, a server determines if data reformatting, conversion, translation, or a combination thereof (hereinafter "manipulation") is necessary. If manipulation is not necessary, step 196 either stores or routes inbound (or outbound) data to the proper destination. See FIG. 10A. However, if manipulation is required as a result of step 184, then a server determines if a process .dll file or shared library exists for data manipulation as shown in step 186, See FIG. 10A. If such a .dll file or shared library is determined to exist, then inbound (or outbound) data is manipulated in step 188 through a process library. See FIG. 10A. If a server determines that a .dll file or shared library does not exist as shown in step 186, then a server determines whether a script 191 exists (or is available) for manipulation of said data as shown in step 190. If a script 191 does exist, a scripting engine loads in step 192 and inbound (or outbound) data undergoes manipulation in step 194 by execution of script 191. However, if a server determines that no script 191 exists (or is available), then a script wizard 283 is opened in step 282. See FIG. 10A. A script wizard 283 enables static scripts 281 to be created by entering shortcut language or extensions by expert users or those users who are unfamiliar with ECMA-262/Javascript or other programming languages. In step 284, a user (or expert) creates a static script 281 by using a script wizard 283. In a preferred embodiment, step 284 of static script creation includes testing, editing, storage or a combination thereof. In step 192, a scripting engine is loaded to execute static script 281 and manipulation of inbound (or outbound) data occurs in step 194. Manipulated data (inbound or outbound) is then sent to step 196 to be stored, re-routed or a combination thereof to the appropriate destination device.

Figure 10B:
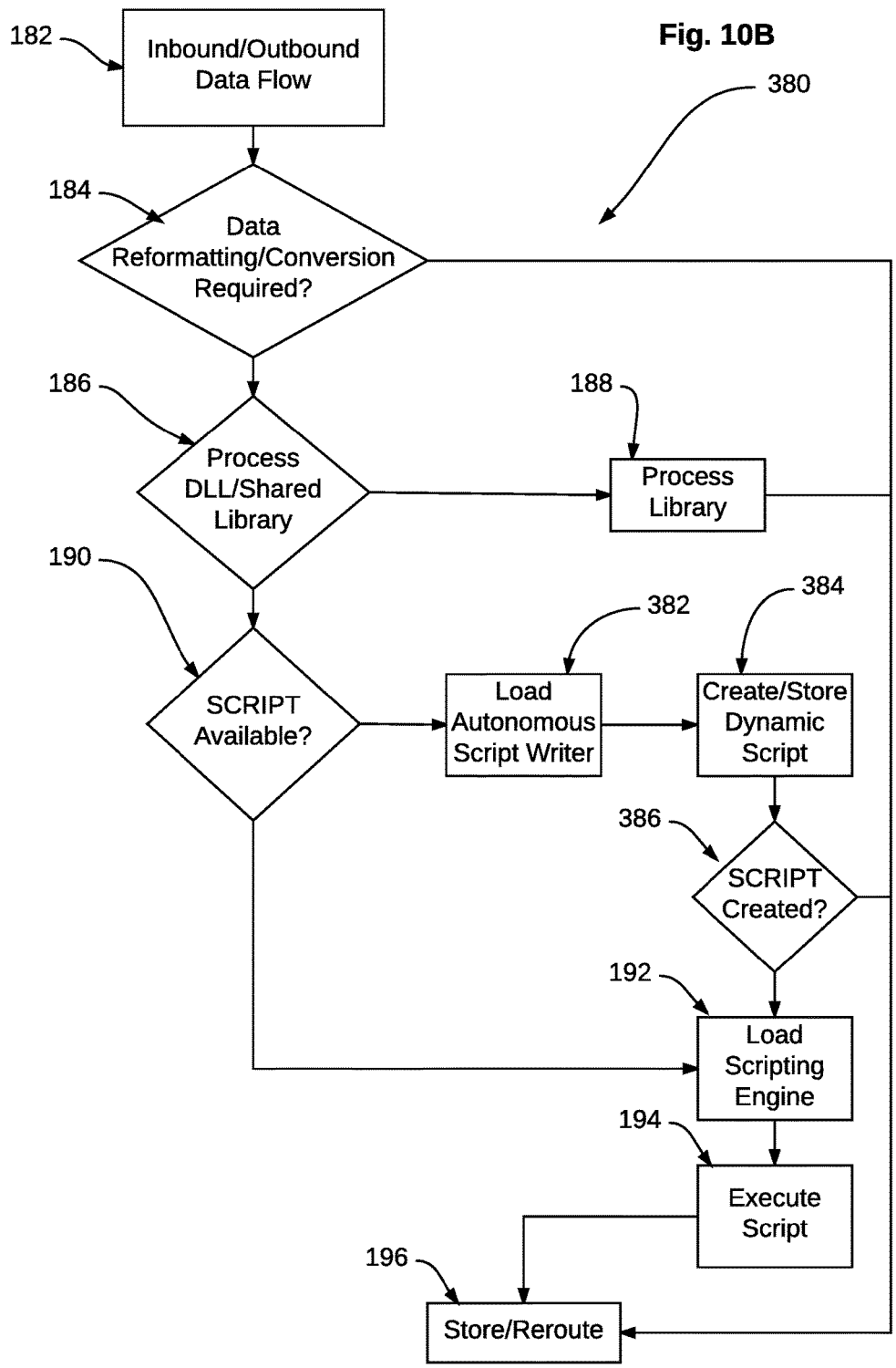
FIG. 10B provides a process flow applying a present disclosure to a process disclosed in Application '795.
Figure 10C:
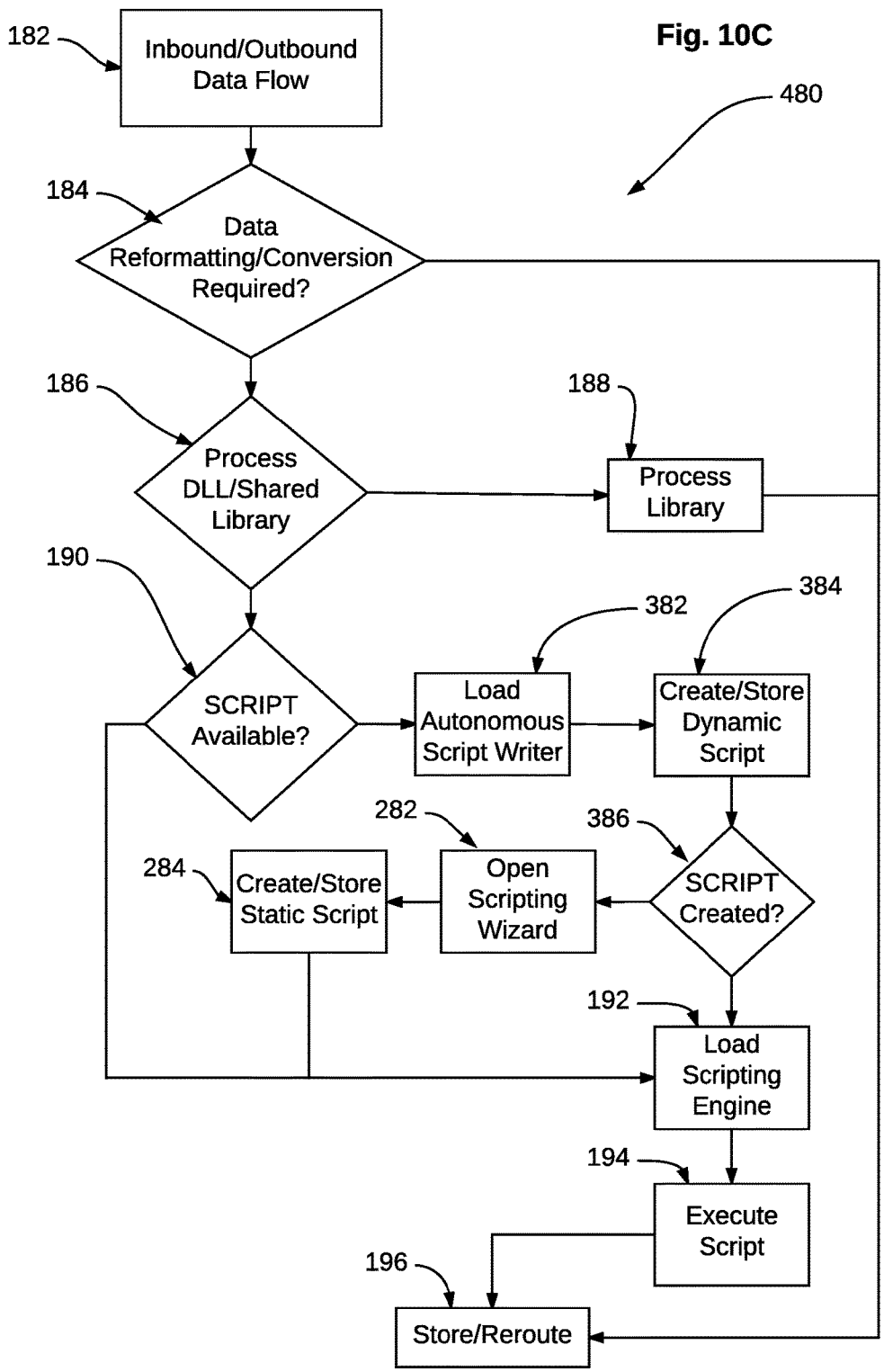
FIG. 10C provides a process flow applying a present disclosure to a process disclosed in Application '795.

FIG. 10B presents an embodiment of an autonomous script writer process flow 380 of the present application to a process disclosed in Application '795. An autonomous script writer 383 loads in step 382 and operates independently in step 384 to create the necessary dynamic scripts 381 for data manipulation thereby alleviating in whole or in part the need for user or expert intervention. It is further contemplated that an autonomous script writer 383 enables scripts 381 to be dynamically created by receiving and examining data (inbound or outbound) rejected from existing scripts 191, step 190 or a combination thereof. It is further contemplated that step 384 of creating dynamic scripts 381 can be transformation step 12 (shown in FIG. 2), included in transformation step 12 (shown in FIG. 2), inserted after or downstream of unsuccessful translation determination step 44 (shown in FIG. 2) or a combination thereof. Scripts created by an autonomous script writer 383 are considered dynamic scripts 381 until stored and used in future data manipulations, wherein each such stored dynamic script 381 becomes an existing script 191.

In more detail, an autonomous script writer process flow 380 is similar to those flow processes described above, in that inbound (or outbound) data flow is received by a server in step 182; and a server determines in step 184 if data manipulation is necessary. If manipulation is not necessary, step 196 either stores or routes inbound (or outbound) data to the proper destination. See FIG. 10B. However, if manipulation is required as a result of step 184, then a server determines if a process .dll file or shared library exists for data manipulation as shown in step 186, See FIG. 10B. If such a .dll file or shared library is determined to exist, then inbound (or outbound) data is manipulated in step 188 through a process library. See FIG. 10B. If a server determines that a .dll file or shared library does not exist as shown in step 186, then a server determines whether a script 191 exists (or is available) for manipulation of said data as shown in step 190. If a script 191 does exist, a scripting engine loads in step 192 and inbound (or outbound) data undergoes manipulation in step 194 by execution of script 191. However, if a server determines that no script 191 exists (or is available), then an autonomous script writer 381 is loaded in step 282. See FIG. 10B. In step 386, a server determines if a dynamic script 381 was created. If no dynamic script 381 is created to manipulate data, the data is stored or routed in step 196. If a server determines in step 386 that a dynamic script 381 was created, a scripting engine is loaded to execute dynamic script 381 and manipulation of inbound (or outbound) data occurs in step 194. See FIG. 10B. Manipulated data (inbound or outbound) is then sent to step 196 to be stored, re-routed or a combination thereof to the appropriate destination device.

In a preferred embodiment, an autonomous script writer 381 enables scripts 381 to be created through step 384 with little or no human intervention by utilizing at least one of the following sub-steps: determining if a message is of a known or unknown type (sub-step 3840); characterizing said message by type (sub-step 3842); conducting content analysis of a message with a known type (sub-step 3844); conducting content analysis of a message with an unknown type (sub-step 3845); creating a new message type (sub-step 3846); cataloging said new message type (sub-step 3848); and generating at least one dynamic script 381 for use by a scripting engine (sub-step 4850). Failure of any or a combination of the above described sub-steps results in no script being dynamically created in step 384 and the message of unknown type is stored or rerouted in step 196 without manipulation (sub-step 4851). A preferred embodiment of the above is depicted in FIG. 10D.

Determining if a message is of a known or unknown type (sub-step 3840) includes identifying a signature or pattern of the data within a message. A known message type would be an XML message and an unknown message type would be a free form plain text message. A message of a known type will be characterized as such in sub-step 3842.

Analyzing a message of a known type (sub-step 3844) utilizes a pre-defined database catalog or other method such as document type definition (DTD) in the case of XML to identify message content. Analyzing a message of an unknown type (sub-step 3845) utilizes at least one of the following routines to identify message content: identification of message type by utilizing previously stored unknown message types successfully identified by an autonomous script writer 383; identification of message type by utilizing external databases, such as standard schedules, information manual (SSIM) to find and identify standardized information such as, but not limited to flight times, flight numbers, departure, arrival, and similar type information; identifying each data element of a message of unknown type utilizing hash techniques, catalog look-ups, or a combination thereof to find standardized information such as, but not limited to times, cities, air speed, distance, fuel and similar type of information; mapping data elements of a message of unknown type utilizing pre-defined message signatures, such as but not limited to, standardized formats for information, such as flight numbers being numberic, cities being of three or four alphanumeric characters; or identifying one or more message routes within a message of unknown type to ascertain the nature of the message, such as, but not limited to, dispatch subject matter, operational subject matter, or other subject matter.

In yet another embodiment, the disclosed subject matter includes a Webservices wizard, which enables communication between two or more electronic systems via the Internet.

In yet another embodiment, the disclosed subject matter is presented on a Graphical User Interface, hereafter identified as GUI. The term GUI is intended to include all electronic devices known in the art that are able to visually present information. Examples include but are not limited to: touch-screen smartphones and tablets, laptops, televisions, and conventional computer, mouse, keyboard and computer monitor combinations. The use of a GUI enables the output of the present disclosure to be interactive and be presented on a visual platform.

In yet another embodiment, the disclosed subject matter is able to operate as a Webserver thus enabling the information to be transmitted over the internet using HTTP.

Figure 11:
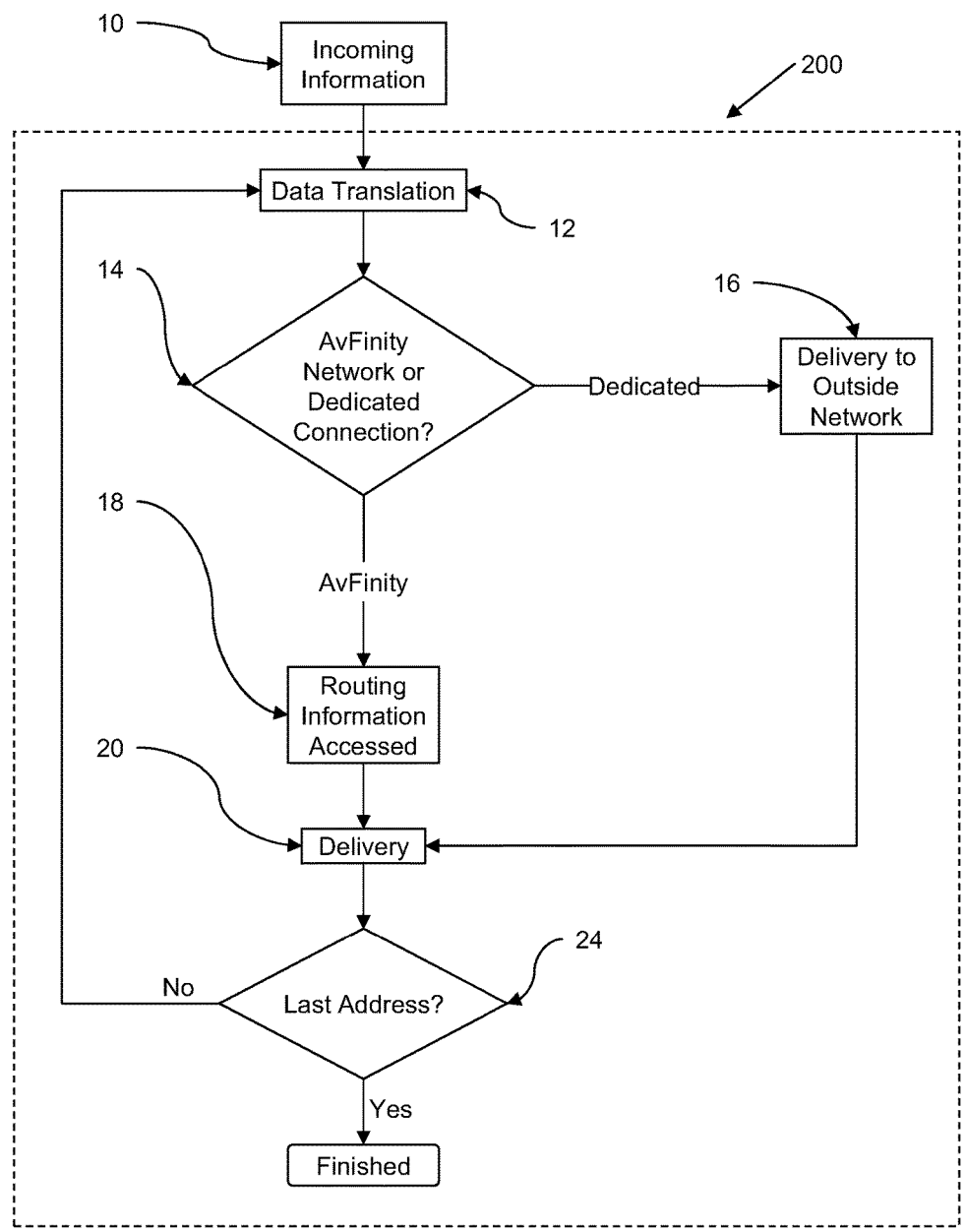
FIG. 11 presents an example of the translation and routing procedure using the example of transmission to a TypeB formatted message of an alternative embodiment.

In an alternative embodiment, the disclosed subject matter can be implemented directly from within a router 200 alleviating the need for a separate server 74 and/or 106, see FIG. 11.

Figure 4:
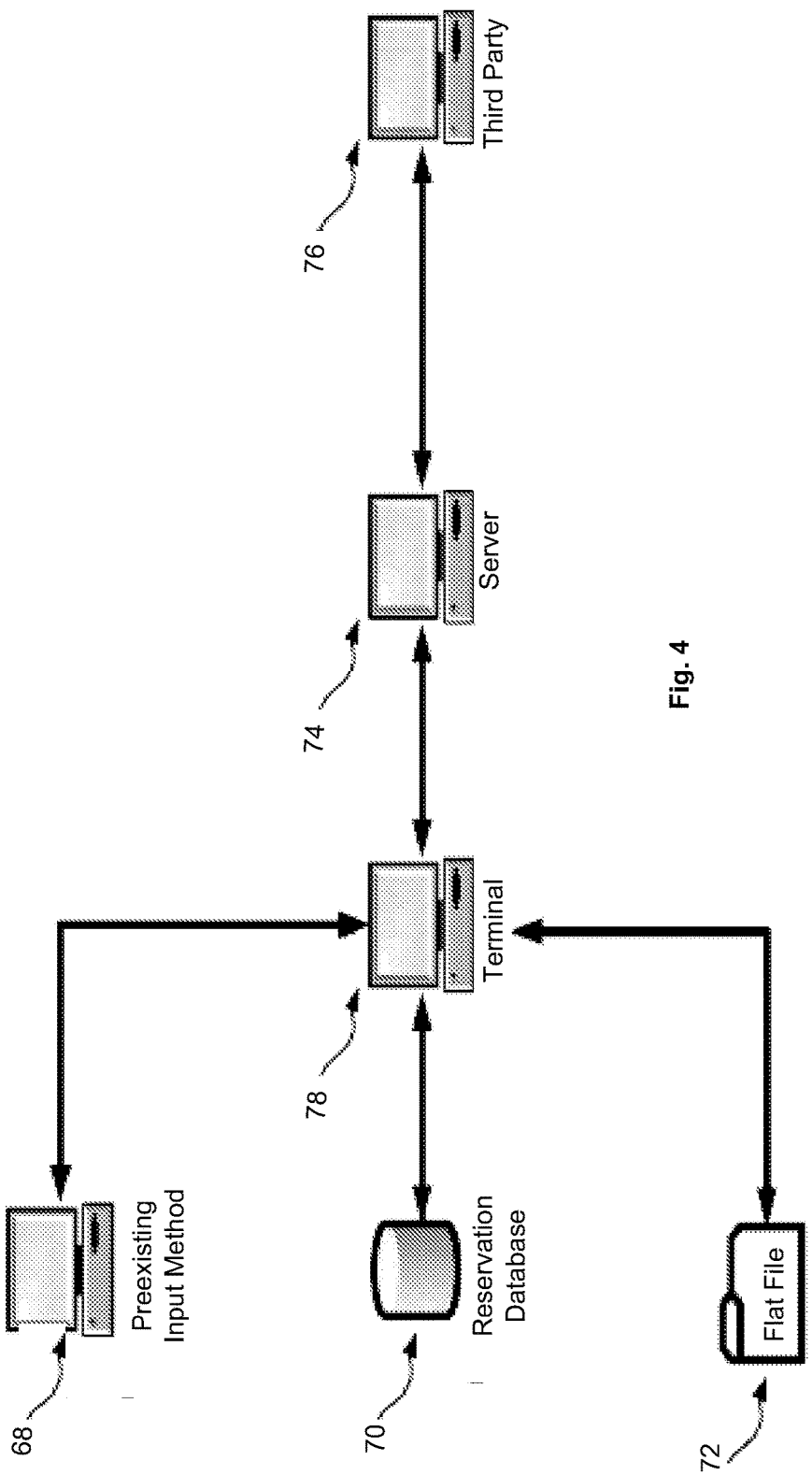
FIG. 4 displays a simplified example of a terminal configuration utilizing the Internet or a dedicated communication means.
Figure 12:
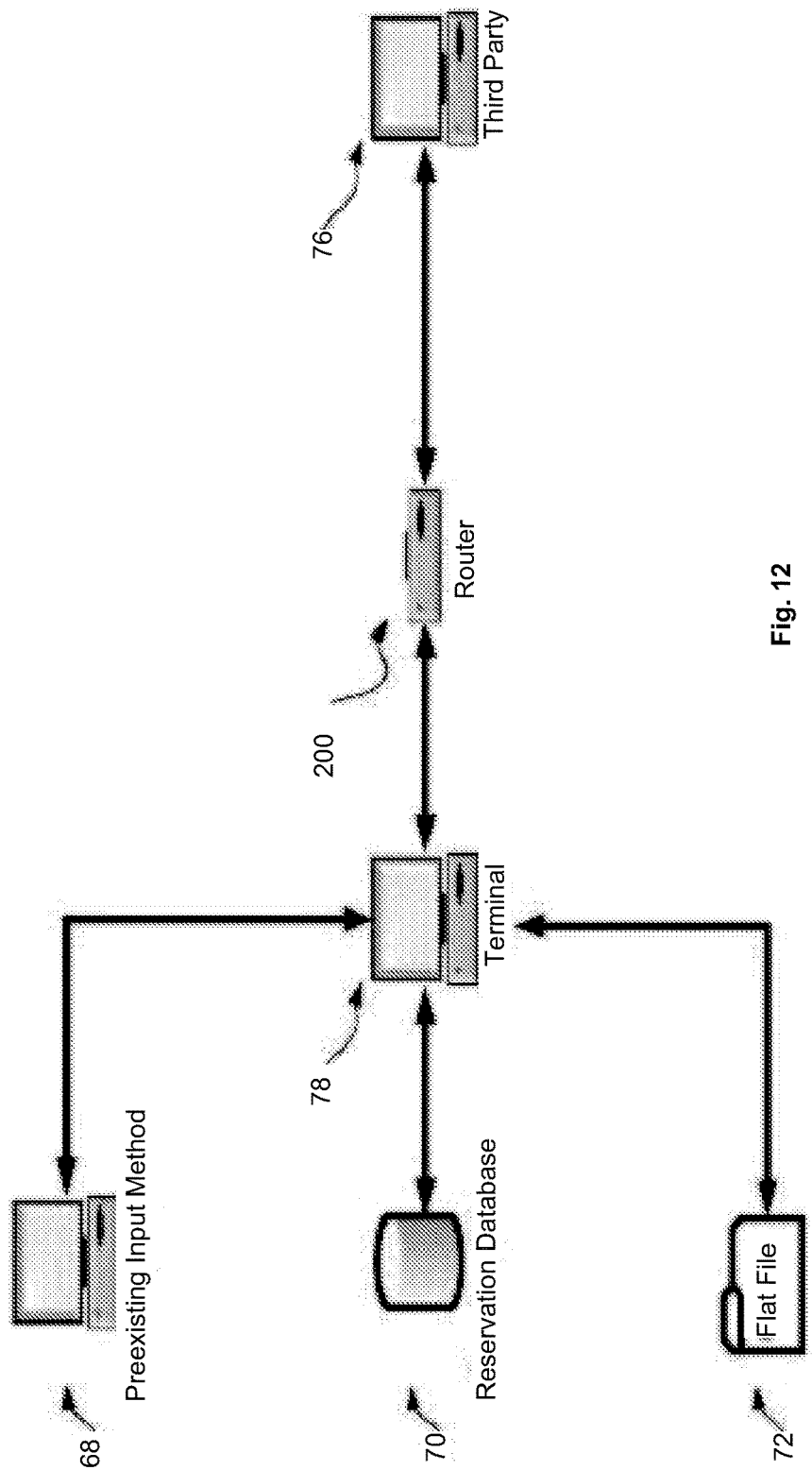
FIG. 12 displays a simplified example of a terminal configuration utilizing the Internet or a dedicated communication means of an alternative embodiment.
Figure 13:
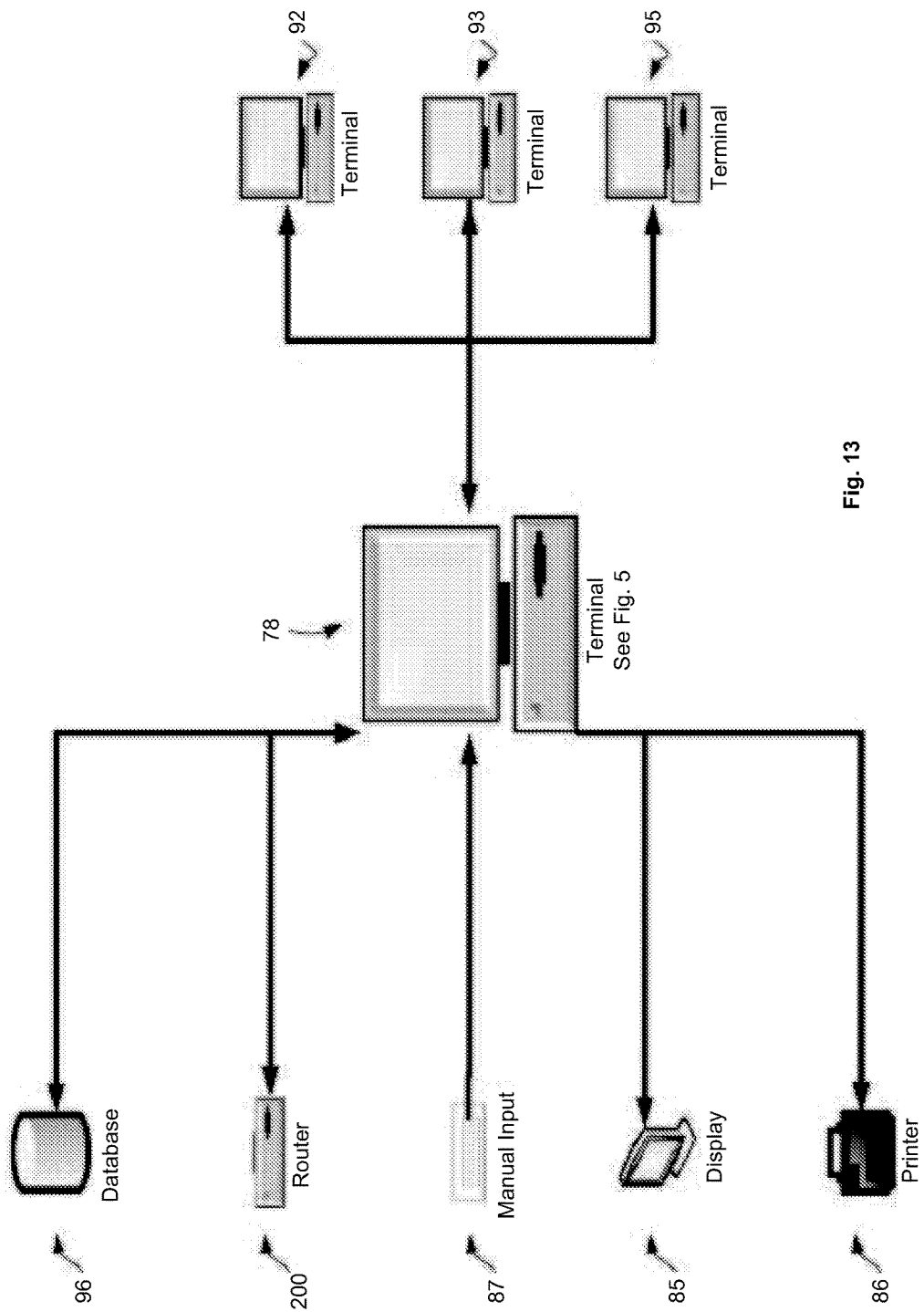
FIG. 13 portrays an example of the Terminal Server configuration of an alternative embodiment.

To better explain this embodiment, previously discussed FIGS. 1, 4, and 7 are shown with reference to the router 200 replacing the server (74 and/or 106) and/or to which portions of flow diagrams are performed on the router 200. The figures corresponding to this embodiment are FIGS. 11, 12, and 13 respectively. However, the principles of operation remain the same and will not be repeated.

In yet another embodiment, the preexisting input device 68, third party/recipient 76, terminals 78, 92, 93, and 95, remote systems 83 and 84, manual input 87, and/or client server 106 could be replaced by one or more routers.

For the purposes of the present disclosure, the term "unhooking" is intended to represent a technique used to alter or augment the behavior of an operating system, of applications, or of other software components by intercepting function calls or messages or events passed between software components. Accordingly, the code that handles such intercepted function calls, events or messages is called a "hook".

For the purposes of the present disclosure the terms "EDIFACT" and "UNEDIFACT" are intended to represent a message type defined and maintained by bodies of the United Nations (UN) that is used to standardize the electronic exchange of information.

For the purposes of the present disclosure, the terminology "IP socket manipulation" is intended to represent is a process of utilizing proprietary or non-standard protocols for the purpose of relaying message traffic via TCP or UDP using a pre-assigned port.

For the purposes of the present disclosure, the terminology "positional character oriented" is intended to represent data elements via a predesignated column in record (typically 80 character wide records)

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention.

The invention claimed is:

1. A non-transitory computer readable medium, said medium encoded with a program capable of executing the steps of:
   inserting an inline communication hook into a scripting language from core binary, said hook permitting two way communication between said scripting language and a compiled binary application thereby allowing customizations to be applied without the need to alter the original core binary application, wherein said scripting language is ECMA-262/JavaScript;
   sending input from said scripting language to said compiled binary application via said hook or sending input from said compiled binary application to said scripting language via said hook without the need to spawn an external ECMA-262 interpreter;
   executing one or more additional commands based on said input, said one or more additional commands are not otherwise available in said scripting language;
   outputting output, in response to said one or more additional commands, to said compiled application via said hook if said input was sent from said scripting language or outputting output, in response to said one or more additional commands, to said scripting language via said hook if said input was sent from said compiled application;
   wherein at least one of said input or output is time sensitive aircraft or marine craft communication and efficiency is enhanced in relation to changing and recompiling said binary application;
   wherein at least one of said one or more additional commands or an error message is received via an autonomous script writer.

2. A method of presenting the medium of claim 1, wherein said additional command is received via a scripting wizard if said error message occurs.

3. The medium of claim 2, wherein said additional command is in at least one of the following classes:
   file manipulation;
   data type determination;
   electronic mail transmission;
   typeB message component identification;
   typeB message manipulation;
   UNEdifact message manipulation;
   XML message manipulation;
   Character delimited (comma or other character);
   Positional character oriented;
   IP socket manipulation;
   printing; and
   database interaction and manipulation.

4. The medium of claim 3, wherein said data type determination determined a data type, wherein said data type is at least one of:

typeB;
text; and
binary.

5. The medium of claim 3, wherein said additional command is at least said file manipulation, and wherein said file manipulation includes at least one of:
reading said file;
saving said file;
appending said file;
retrieving a file name;
retrieving a list of files;
copying said file;
moving said file; and
deleting said file.

6. The medium of claim 3, wherein said additional command is at least said database interaction and manipulation wherein said database interaction and manipulation includes interacting and manipulating a database, wherein said database is at least one of:
ODBC;
Oracle;
SQL Server;
Interbase;
SQL Base;
Inform ix;
Sybase;
MySQL; and
PostgreSQL.

7. The medium of claim 6, wherein said additional command is at least said data type determination and said file manipulation, wherein said database determination determines a data type, and wherein:
said data type is at least one of:
typeB;
text; and
binary; and
said file manipulation includes at least one of:
reading said file;
saving said file;
appending said file;
retrieving a file name;
retrieving a list of files;
copying said file;
moving said file; and
deleting said file.

8. The medium of claim 2, wherein said compiled binary application does not require recoding or recompiling in response to an addition, modification, or deletion to said one or more additional command(s).

9. The medium of claim 8, wherein said additional command is at least file manipulation, and wherein said file manipulation includes at least one of:
reading said file;
saving said file;
appending said file;
retrieving a file name;
retrieving a list of files;
copying said file;
moving said file; and
deleting said file.

10. The method of claim 8, wherein said additional command is at least database interaction and manipulation wherein said database interaction and manipulation includes interacting and manipulating a database, and wherein said database is at least one of:
ODBC;
Oracle;
SQL Server;
Interbase;
SQL Base;
Inform ix;
Sybase;
MySQL; and
PostgreSQL.

11. The medium of claim 8, wherein said additional command is in at least one of the following classes:
file manipulation;
data type determination;
electronic mail transmission;
typeB message component identification;
typeB message manipulation;
printing; and
database interaction and manipulation.

12. The medium of claim 11, wherein said additional command is at least said file manipulation, and wherein said file manipulation includes at least one of:
reading said file;
saving said file;
appending said file;
retrieving a file name;
retrieving a list of files;
copying said file;
moving said file; and
deleting said file.

13. The medium of claim 11, wherein said additional command is at least database interaction and manipulation wherein said database interaction and manipulation includes interacting and manipulating a database, and wherein said database is at least one of:
ODBC;
Oracle;
SQL Server;
Interbase;
SQL Base;
Inform ix;
Sybase;
MySQL; and
PostgreSQL.

14. A method for translating between protocols, the method comprising:
inserting an inline communication hook into a scripting language from core binary, said hook permitting two way communication between said scripting language and a compiled binary application thereby allowing customizations to be applied without the need to alter the original core binary application, wherein said scripting language is ECMA-262/JavaScript;
sending input from said scripting language to said compiled binary application via said hook or sending input from said compiled binary application to said scripting language via said hook without the need to spawn an external ECMA-262 interpreter;
executing one or more additional commands based on said input, said one or more additional commands are not otherwise available in said scripting language;
outputting output, in response to said one or more additional commands, to said compiled application via said hook if said input was sent from said scripting language or outputting output, in response to said one or more additional commands, to said scripting language via said hook if said input was sent from said compiled application;
wherein at least one of said input or output is time sensitive aircraft or marine craft communication and efficiency is enhanced in relation to changing and recompiling said binary application;

wherein at least one of said one or more additional commands is received via an autonomous script writer.

* * * * *